United States Patent [19]
Marcoz

[11] Patent Number: 5,243,128
[45] Date of Patent: Sep. 7, 1993

[54] SEWER CLEANING APPARATUS

[75] Inventor: René Marcoz, Chatel Guyon, France

[73] Assignee: Caoutchouc Manufacture ET Plastioues S.A., Versailles, France

[21] Appl. No.: 665,770

[22] Filed: Mar. 7, 1991

[30] Foreign Application Priority Data

Mar. 7, 1990 [FR] France .................. 90 02998

[51] Int. Cl.⁵ ............... E21B 47/04; F16L 55/00; F16L 11/12; G01B 7/04
[52] U.S. Cl. .................. 174/47; 33/716; 33/719; 33/733; 138/104; 324/206; 324/207.16; 324/207.24; 324/226; 324/234
[58] Field of Search ........... 134/113, 167 C, 168 C; 138/103, 104; 324/206, 207.11, 207.13, 207.14, 207.15, 207.16, 207.20, 207.21, 207.22, 207.23, 207.24, 221, 226, 67, 326, 327, 328, 329, 234; 33/716, 719, 732, 733, 750, DIG. 1; 174/47

[56] References Cited

U.S. PATENT DOCUMENTS

| 4,60,884 | 7/1886 | Hara ..................... 324/326 |
| 2,902,765 | 9/1889 | Charter .................. 324/207.16 |
| 2,989,690 | 6/1961 | Cook ..................... 324/206 |
| 3,367,370 | 2/1968 | Sherlock ................. 138/104 |
| 3,873,912 | 3/1975 | Mori ..................... 324/206 |
| 3,915,199 | 10/1975 | Kida . |
| 3,990,065 | 11/1976 | Purinton et al. . |
| 4,041,610 | 8/1977 | Uesugi ................... 324/206 |
| 4,059,847 | 11/1977 | Phillips ................. 138/103 |
| 4,316,081 | 2/1982 | Washizuka et al. . |
| 4,535,289 | 8/1985 | Abe ...................... 324/207.23 |
| 4,578,642 | 3/1986 | Moake .................... 324/226 |
| 4,645,697 | 2/1987 | Torigoe .................. 138/103 |
| 4,654,590 | 3/1987 | Kitaura .................. 324/207.13 |
| 4,699,838 | 10/1987 | Gilbert .................. 138/104 |
| 4,700,422 | 10/1987 | Russell . |
| 4,718,168 | 1/1988 | Kerr . |
| 4,818,939 | 4/1989 | Takahashi ................ 324/207.24 |
| 4,896,686 | 1/1990 | Schmidt .................. 134/167 C |
| 4,935,984 | 6/1990 | Bryant ................... 134/168 C |
| 5,006,866 | 4/1991 | Rippingale .............. 138/104 |
| 5,036,210 | 7/1991 | Goodman ................. 138/104 |
| 5,040,259 | 8/1991 | Ishii .................... 134/113 |
| 5,052,444 | 10/1991 | Messerly ................ 138/103 |

FOREIGN PATENT DOCUMENTS

| 889255 | 12/1981 | Belgium . |
| 0286820 | 9/1980 | European Pat. Off. . |
| 0270387 | 10/1988 | European Pat. Off. . |
| 2832547 | 2/1980 | Fed. Rep. of Germany ...... 138/104 |
| 3321480 | 12/1983 | Fed. Rep. of Germany ...... 324/206 |
| 1298224 | 5/1962 | France ................... 138/103 |
| 2379871 | 9/1981 | France . |
| 389139 | 11/1983 | France . |
| 2609417 | 7/1988 | France . |
| 2615983 | 12/1988 | France . |
| 2616565 | 12/1988 | France . |
| 55-122102 | 9/1980 | Japan . |
| 61-174447 | 8/1986 | Japan . |
| 63-81205 | 4/1988 | Japan . |
| 50952 | 2/1989 | Japan .................... 324/206 |
| 1121581 | 10/1984 | U.S.S.R. . |
| 1602877 | 11/1981 | United Kingdom . |
| 2093593 | 9/1982 | United Kingdom . |
| 2183044 | 11/1986 | United Kingdom . |

*Primary Examiner*—Harvey C. Hornsby
*Assistant Examiner*—Terrence R. Till
*Attorney, Agent, or Firm*—Nils H. Ljungman & Associates

[57] ABSTRACT

A mobile sewer cleaning apparatus having a rotating drum and a flexible hose wound thereon. Preferably mounted on the sewer cleaning apparatus is a device for measuring the length of hose paid out from the drum. The measuring device may be used, among other things, for measuring the speed of the hose as it is wound or unwound from the drum, and for controlling a safety device intended to stop the flow of water through the hose as the hose is being wound.

2 Claims, 11 Drawing Sheets

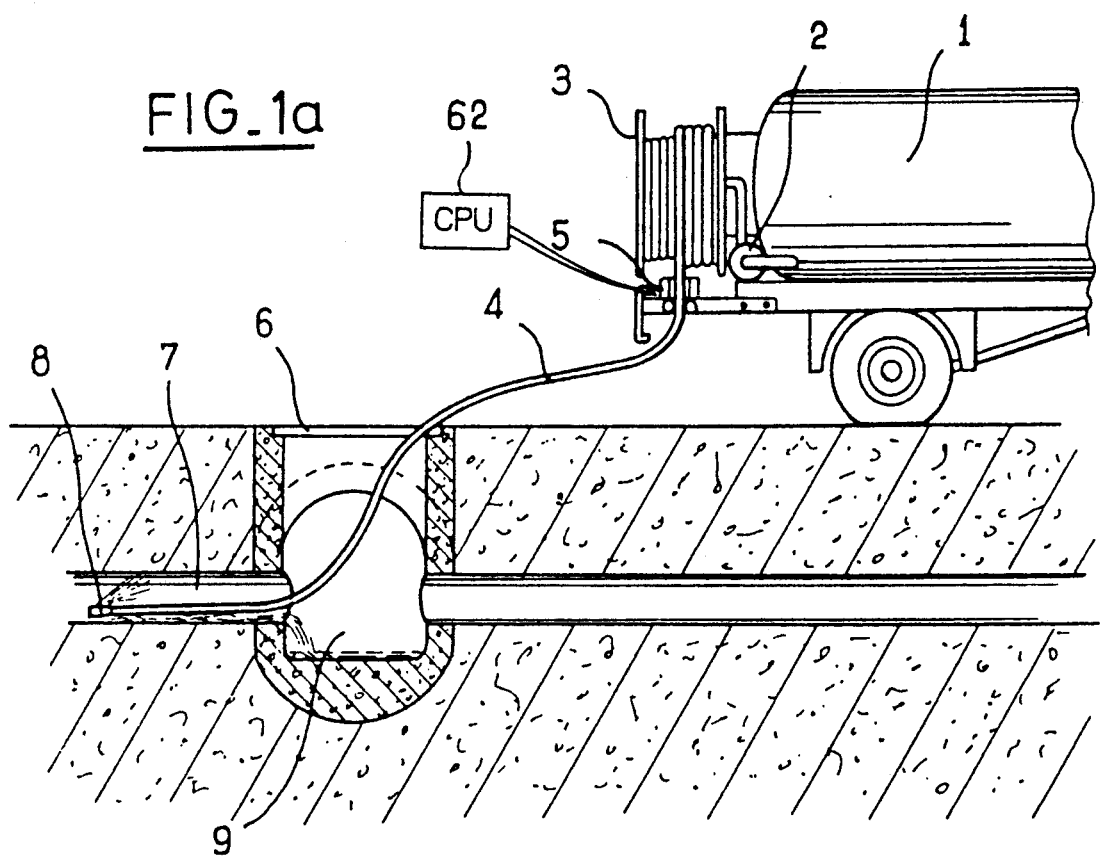
FIG_1a

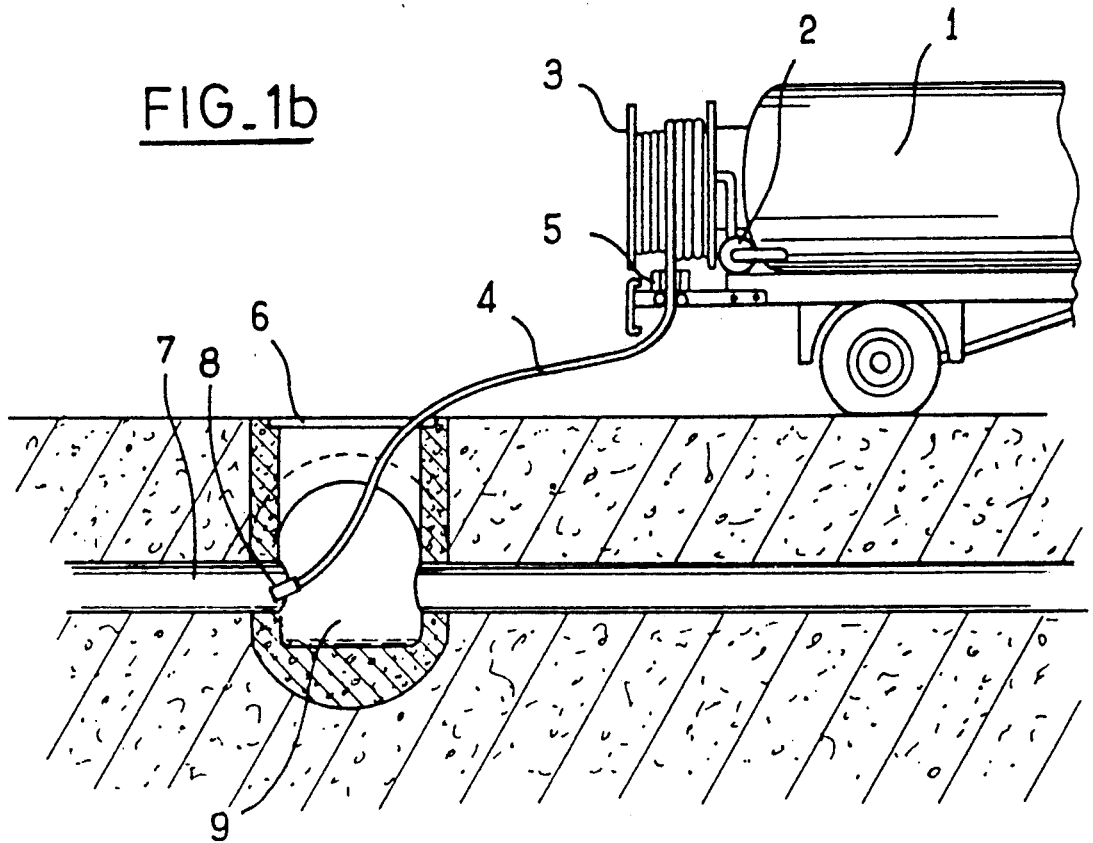
FIG_1b
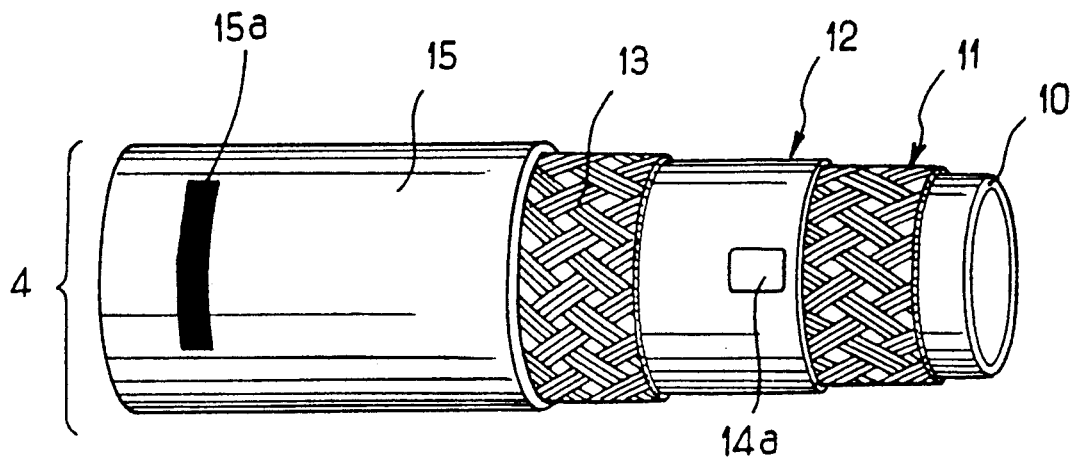
FIG_2a

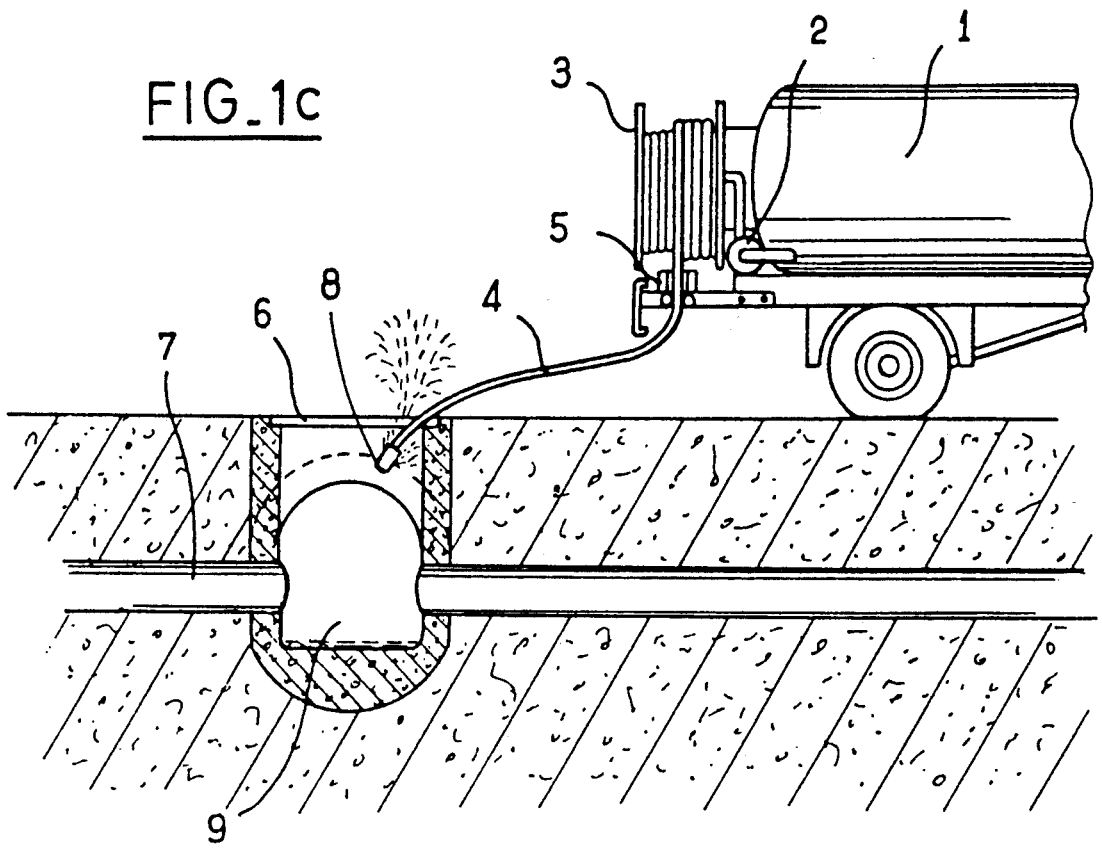
FIG_1c
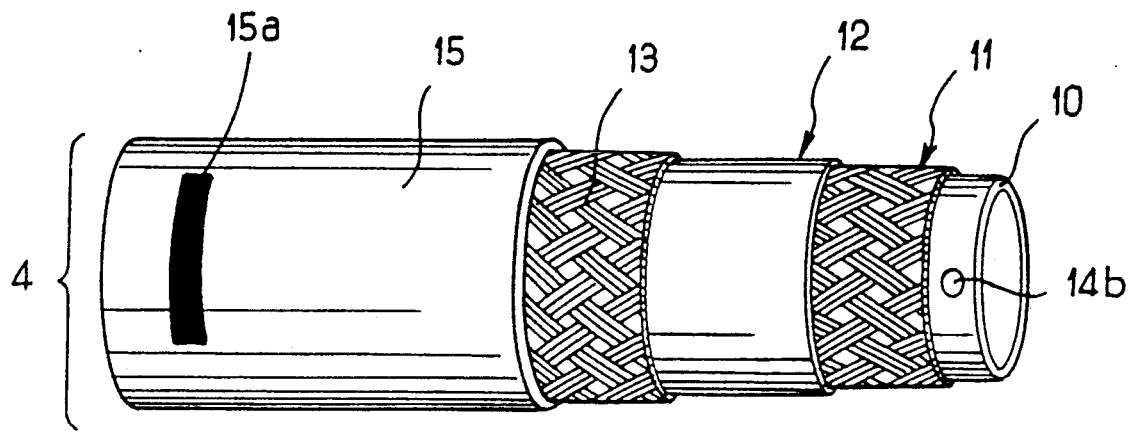
FIG_2b

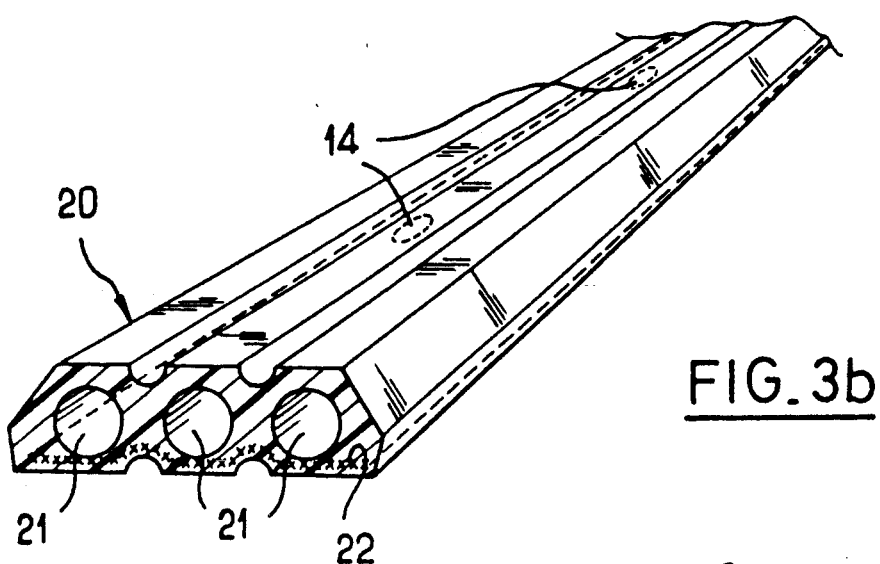
FIG._3b
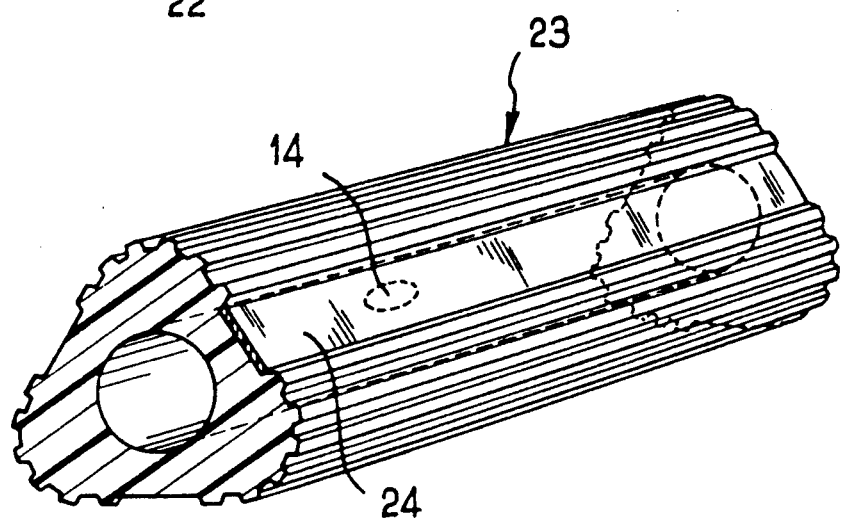
FIG._3c
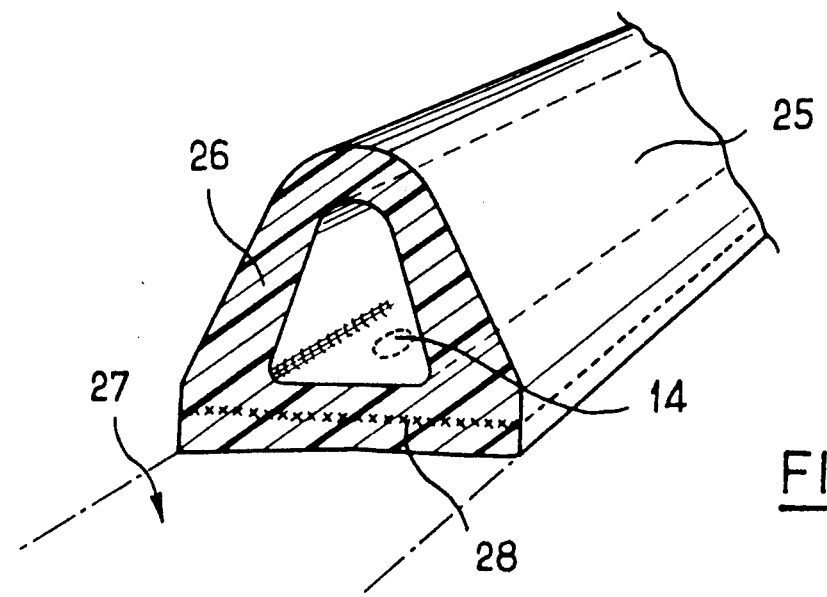
FIG._3d

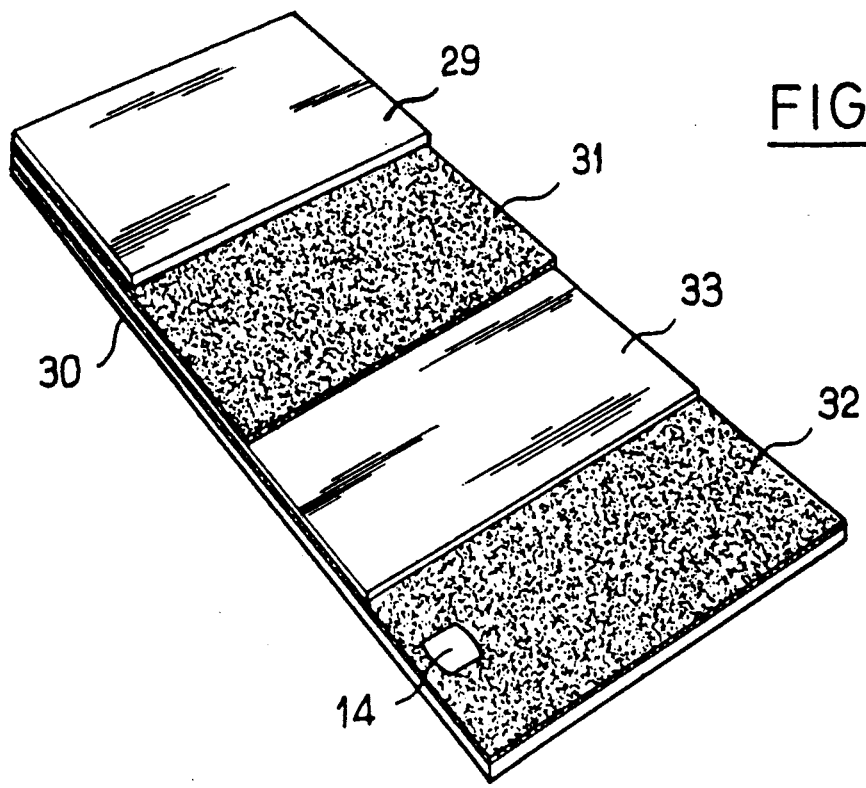
FIG_4a
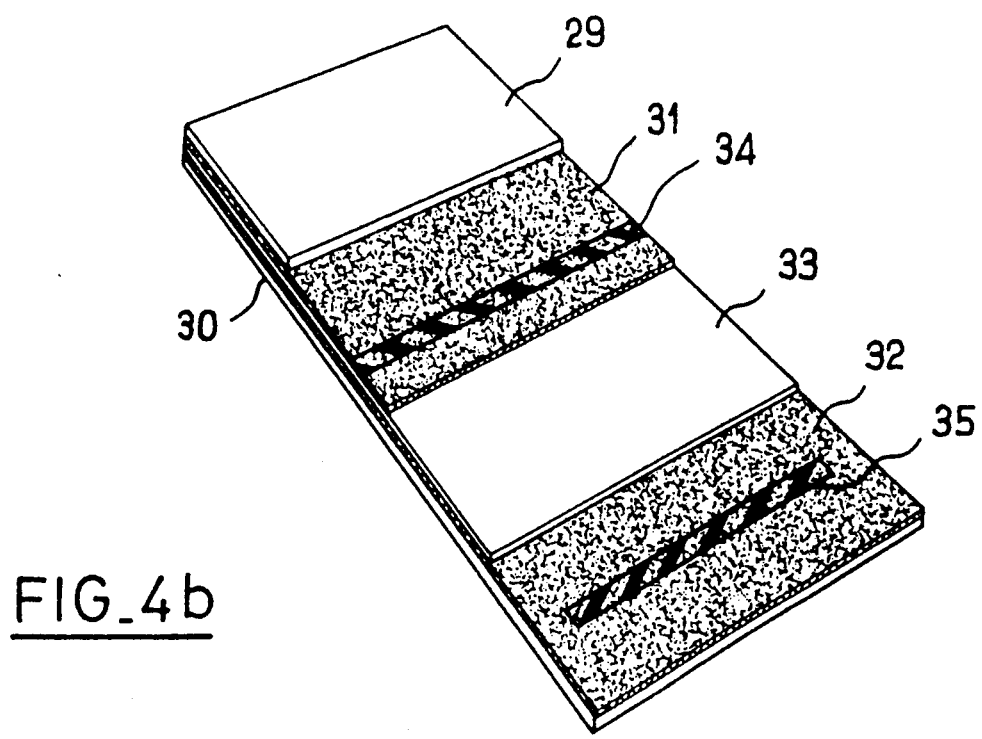
FIG_4b

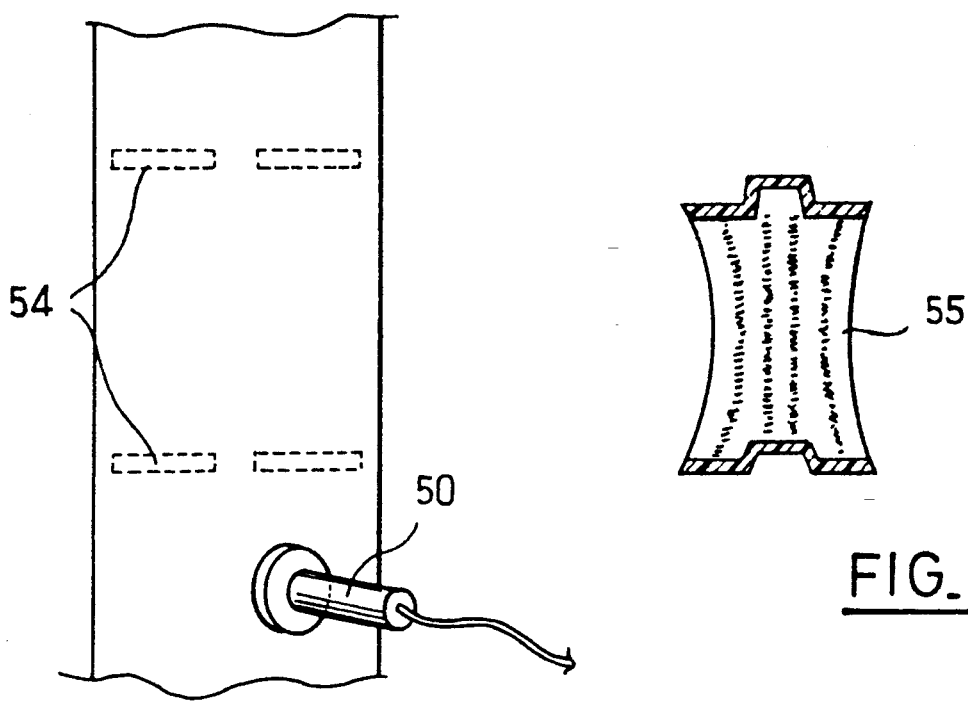
FIG._8c
FIG._8b
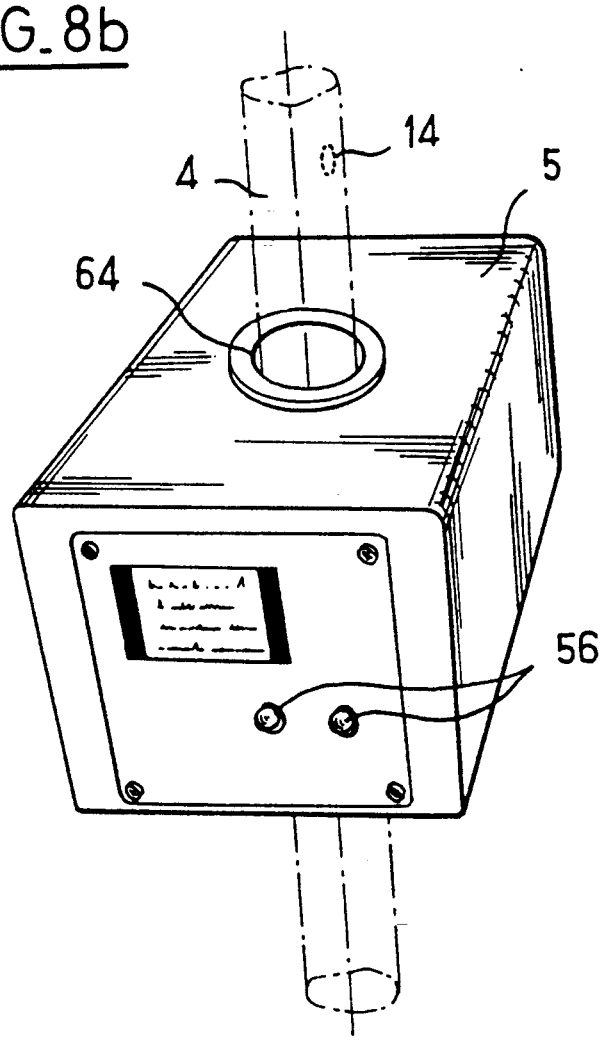
FIG._9a

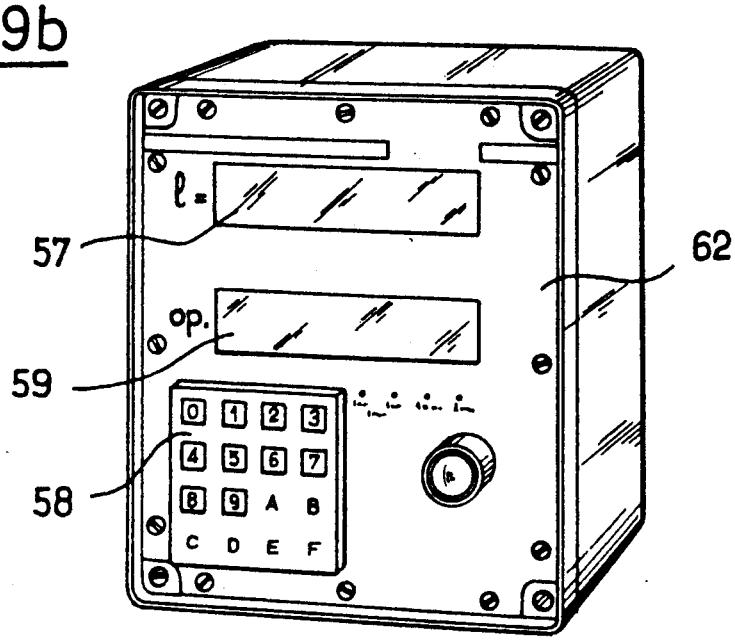
FIG_9b
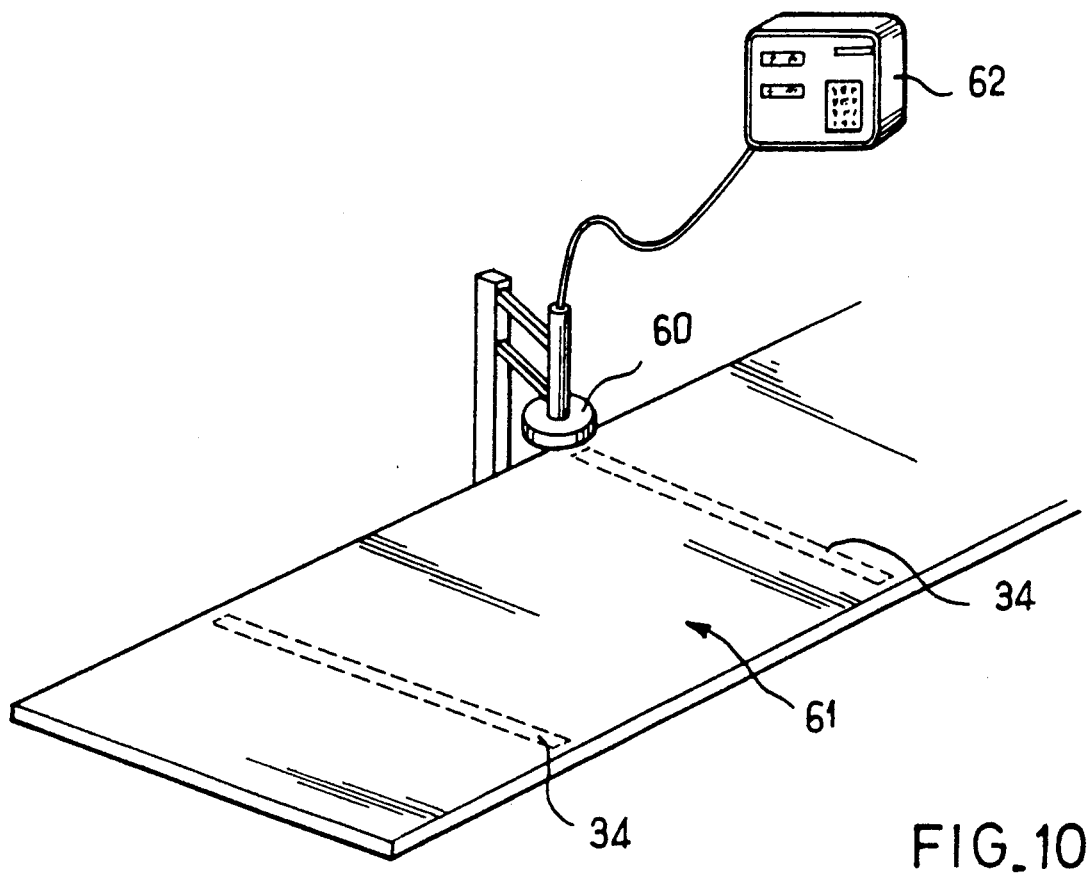
FIG_10

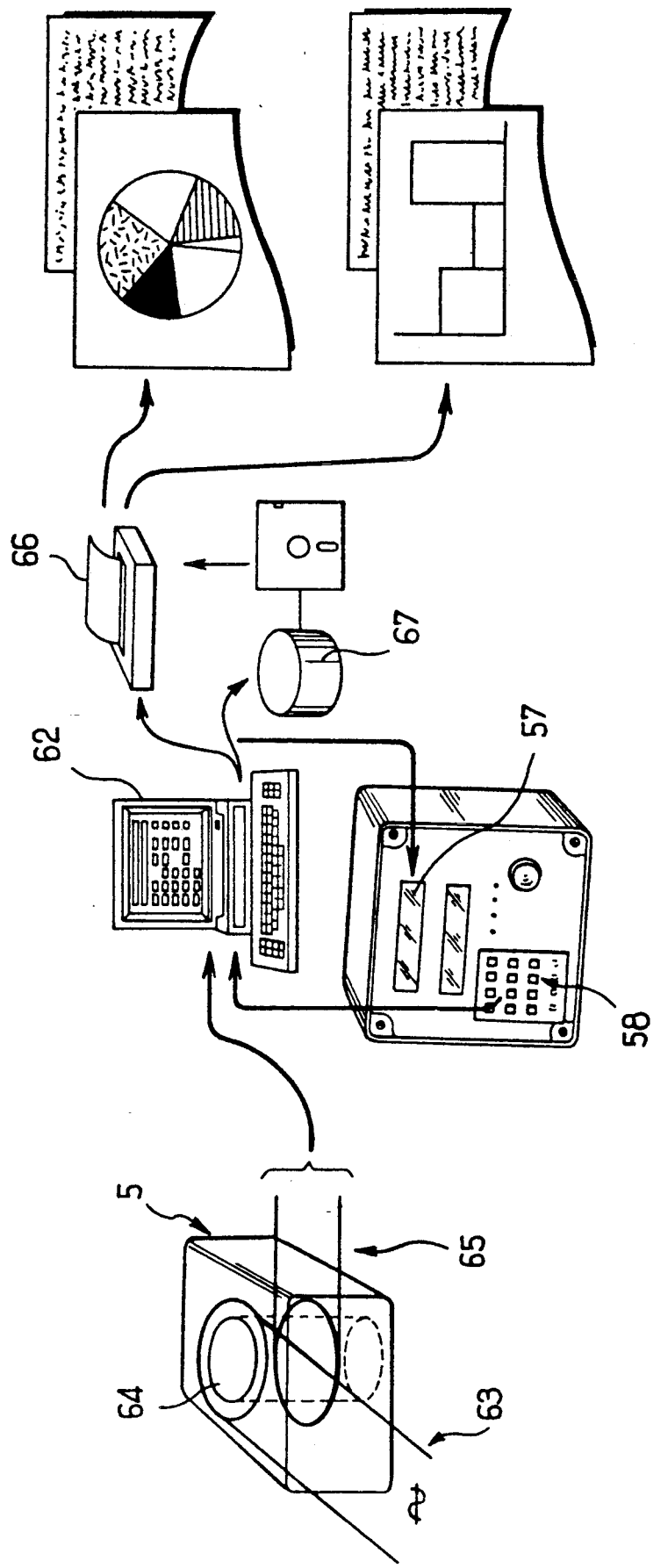
FIG._11

SEWER CLEANING APPARATUS

BACKGROUND OF THE INVENTION

1. Field of the Invention

The present invention is primarily directed to a mobile sewer cleaning apparatus having a rotating drum and a flexible hose wound thereon. Preferably mounted on the sewer cleaning apparatus is a device for measuring the length of hose paid out from the drum. The measuring device may be used, among other things, for measuring the speed of the hose as it is wound or unwound from the drum, and for controlling a safety device intended to stop the flow of water through the hose as the hose is being wound.

2. Background Information

Numerous devices which make it possible to measure the length of a substantially continuous object, or to measure the positioning of an article in an environment, are known. Such devices have been disclosed in relation to apparatus for the cleaning of a sewer or drain. For example, the use of optical means for the detection of the positioning of an object is disclosed in U.S. Pat. No. 4,700,422 (RUSSELL) and French Patent No. 2,609,417 (VAIRE). The latter French patent discloses the use of a video camera for marking the positioning of a sewer flushing device, which camera may also be stabilized by lateral jets.

Generally, such devices as mentioned above have also been disclosed for applications in the field of textiles, for applications with very long articles, and for applications with individual objects in the field of anti-theft protection. Such devices generally make use of detection either by mechanical means, by optical means, or by electrical or electronic means.

Generally, the most common mechanical device for the measurement of length make use of the counting of the number of revolutions of a drum or support of the very long, flexible article being measured. Such devices are used particularly in the textile industry. For example, such devices are used for the measurement of the length of wool threads of a loom, as disclosed in Belgian Patent No. 889 255 (WEEFAUTOM PICANOL), U.S. Pat. No. 3,915,199 (TEIJIN), and Japanese Patent No. 61 174 447 (TOYODA AUTOMAT LOOM).

Various electrical, electronic and even magnetic or electromagnetic means have been proposed. For example, USSR Inventor's Certificate No. 1,121,581 (PETROV) discloses means for the determination of the length of an elastic fabric. French Patent No. 2,389,139 (SOCOTEC) discloses means for the detection of a defect in cables embedded in concrete. U.S. Pat. No. 3,990,065 (MAGNAVOX) and French Patent No. 2,379,871 (KNOGO) both disclose means for the detection of thefts of objects in warehouses. Most particularly, means for the identification of articles by reading a recently developed "bar code" is the subject of numerous patents, including French Patent Nos. 2,616,565 (LACROUTS-CAZENAVE) and 2,615,983 (SOGEDEC).

Generally, all of the devices of the known art relating to the determination of the length, speed or positioning of an object have various disadvantages. Among these disadvantages are: for mechanical devices, a lack of precision; for electromagnetic detection systems, the complexity of the detection installation, which installation tends only to be designated for the application at hand; the difficulty of using optical devices in locations which are not well lit, including the need to utilize a supplemental light source, which is not always easy to manage; and, in a great many applications, such as applications for the reading of "bar codes" or for anti-theft devices, the necessity for providing visible markings, of which the aesthetics are debatable, and which tend to limit the usefulness of the article or must be removable after detection, such as for the magnetic markings applied to articles of clothing.

Additionally, the invention may relate more generally to the linear measurement and positioning of very long, flexible articles. The invention makes use of concealed markings which can be detected by means of an associated reader device preferably incorporating electromagnetic means. In other applications, the invention may be used for the measurement of the speed of movement, or for the marking of lengths, of a very long, flexible article. Furthermore, the invention may be used for the detection of the position of a given portion, such as an extremity, of a very long, flexible article.

OBJECTS OF THE INVENTION

The object of the present invention is to advantageously equip a sewer cleaning apparatus, which is intended to present substantial operational advantages. These operational advantages are primarily applied to the long flexible hose included with the apparatus, and to means for winding and unwinding the hose. The present invention, as applied herein, essentially does not alter the external appearance of the flexible hose and may be applied to the hose without appreciable modification either of its fabrication technology or of its flexibility and deformability in a finished state. Furthermore, the present invention, as adopted herein, is generally inexpensive and essentially requires only the use of a simple detection device for optimal utilization of the invention.

A further object of the invention is achieved by means for the linear measurement of length, speed or positioning, which are intended to eliminate the disadvantages of the systems of the known art by applying what may be termed an "invisible solution". More particularly, the solution presented herein essentially does not alter the external appearance of the article in question. The present invention may be applied to very long, flexible articles without appreciable modification either of their fabrication technology or of their flexibility and deformability in the finished state. Furthermore, the physical components presented as a solution herein are generally inexpensive and essentially require only the use of simple electromagnetic detectors for being detected or read. Currently, such simple electromagnetic detectors are generally commercially available. When used with an associated data processing system, the means for the linear measurement of length, speed or positioning also allow for the integration of the logistics of an operation.

SUMMARY OF THE INVENTION

The present invention is primarily directed to a mobile sewer cleaning apparatus having a rotating drum and a flexible hose wound thereon. Preferably mounted on the sewer cleaning apparatus is a device for measuring the length of hose paid out from the drum. The measuring device may be used for, among other things, the measurement of the speed of the hose as it is wound or unwound from the drum and the control of a safety device intended to stop the flow of water through the hose as the hose is being wound.

One aspect of the invention resides broadly in sewer cleaning apparatus comprising: hose storage means; a hose wound about the hose storage means; the hose comprising a hose body; the hose body having a first end and a second end; fluid output means being connected at the first end of the hose body; fluid supply means being connected at the second end of the hose body; the hose body comprising an internal tube and an external covering disposed about the internal tube; marking means disposed within the external covering; the marking means being disposed in a substantially longitudinal direction over a substantial length of the hose; means for detecting the marking means, the detecting means being disposed substantially adjacent at least a portion of the hose; means for determining extension of the hose; the means for determining being connected to and receiving information from the detecting means; the hose being displaceable in at least a longitudinal direction; and the detecting means being for detecting movement of the marking means as the hose is moved by the detecting means.

Another aspect of the invention resides broadly in a hose, the hose comprising: an external surface and an internal portion, the internal portion being disposed substantially within the external surface; marking means disposed substantially within the internal portion, the marking means being disposed over a length of the hose; and the marking means being configured for being detected by sensing means.

Yet another aspect of the invention resides broadly in substantially long article, the article comprising: at least one external surface and an internal portion, the internal portion being disposed substantially within the at least one external surface; marking means disposed substantially within the internal portion, the marking means being disposed over a length of the article; and the marking means being configured for being detected by sensing means.

Generally, among the very long flexible articles to which the invention may apply, the following may be cited as non-restrictive examples: pipes and tubes, profiles, flexible sheets and strips, optical fibers and any other flexible articles which are fabricated in lengths greater than or equal to about twenty times the largest cross-sectional dimension. It should be understood that the term "profile", as used herein, may refer to a substantially long object preferably having a substantially constant cross-sectional shape throughout the length of the object. For example, as will be seen further below, a profile may be a lining made of a substantially elastomeric compound, for being disposed on each of four sides of a billiard table, which lining is for the purpose of to substantially deflecting any ball which comes in contact with the profile.

The invention substantially comprises installing elements which may have magnetic or electrical characteristics different from those of the components of the very long, flexible article in question. Furthermore, the installation of these elements is preferably undertaken during the fabrication of the very long, flexible article, wherein, preferably, the elements are substantially embedded in the thickness of the wall of the very long, flexible article, and thus concealed from a user's sight.

To simplify the explanation of the invention, the above-mentioned elements will be designated hereinbelow by the term "concealed markings".

The invention is essentially a means for the linear measurement of lengths, speed or positioning. It is characterized by the fact that the means comprise concealed markings embedded at regular intervals in the thickness of a wall of a very long, flexible article. That is, the concealed markings of the present invention may comprise a number of separate, discrete inclusions, or may comprise at least one substantially long, continuous inclusion disposed through a substantial portion of the length of the very long, flexible article. Preferably, the article has a substantially prismatic or cylindrical shape. When read by appropriate sensors, the concealed markings create a disturbance of a dynamic magnetic field detected by the sensors. The concealed markings may be in the form of continuous or discrete, discontinues inclusions substantially embedded in the thickness of the very long, flexible article. The inclusions, either by formulation, when subjected to the action of a dynamic magnetic or electric field, or inherently, preferably have a magnetic or electrical conductivity which may be substantially higher, preferably about 10 times higher, than that of any of the components of the very long, flexible article.

The concealed markings may also be in the form of deliberately created gaps in a material preferably having high magnetic or electrical conductivity, such as in a metal. The gaps may also be created in an alloy inherently possessing such properties, or to which such properties can be imparted by an appropriate treatment. The material itself may then be embedded in the thickness of the very long, flexible article.

BRIEF DESCRIPTION OF THE DRAWINGS

The invention, its variants and its applications are explained in greater detail below, with reference to the accompanying drawings, in which:

FIGS. 1a-1c illustrate a mobile sewer cleaning apparatus of the present invention, with a rotating drum and a flexible hose mounted thereon;

FIG. 2 is a stepwise partial cut-away view, showing a variant of the means for the linear measurement of length, speed or positioning according to the invention, wherein such means are placed in the thickness of the wall of a flexible tube, which flexible tube may be of the type used in the sewer line flushing application illustrated in FIGS. 1a-1c;

FIGS. 3a-3d illustrate variant applications of the means for the linear measurement of the length, speed or positioning substantially in the form discrete concealed markings in flexible profiles;

FIGS. 4a and 4b illustrate two variant applications of the means for the linear measurement of length, speed or positioning, which means are also substantially in the form of discrete, concealed markings, and wherein the very long, flexible article is in the form of sheet or strip;

FIGS. 8a-8c illustrate an application of linear means to mark length, speed or position for the fabrication of a very long, multi-layer flexible article, in which article at least one of the internal layers is a material having high magnetic or electrical conductivity, such as a metal or alloy, and wherein the concealed markings are preferably discrete and consist of deliberately created gaps;

FIGS. 9a and 9b are schematic illustrations of a magnetic loop reading device for linear measurements of length, speed or positioning constituted by discrete concealed markings;

FIG. 10 is a schematic illustration of a device for reading or measuring the passage of a very long, flexible article by means of a flat electromagnetic pickup, wherein the pickup detects the means for the linear measurement of length, speed or position; and FIG. 11 is a schematic illustration of an adaptation of the means for the linear measurement of length, speed or positioning for use in logistical operations in manufacturing, when used in conjunction with an associated data processing system.

It should be understood that, in more general terms, FIGS. 1a-1c illustrate an application wherein a hose used for the flushing of sewers or drain lines constitutes a very long, flexible article to be used in the present invention, and wherein the application uses linear position marking means of the present invention.

DESCRIPTION OF THE PREFERRED EMBODIMENTS

Figure 3A:
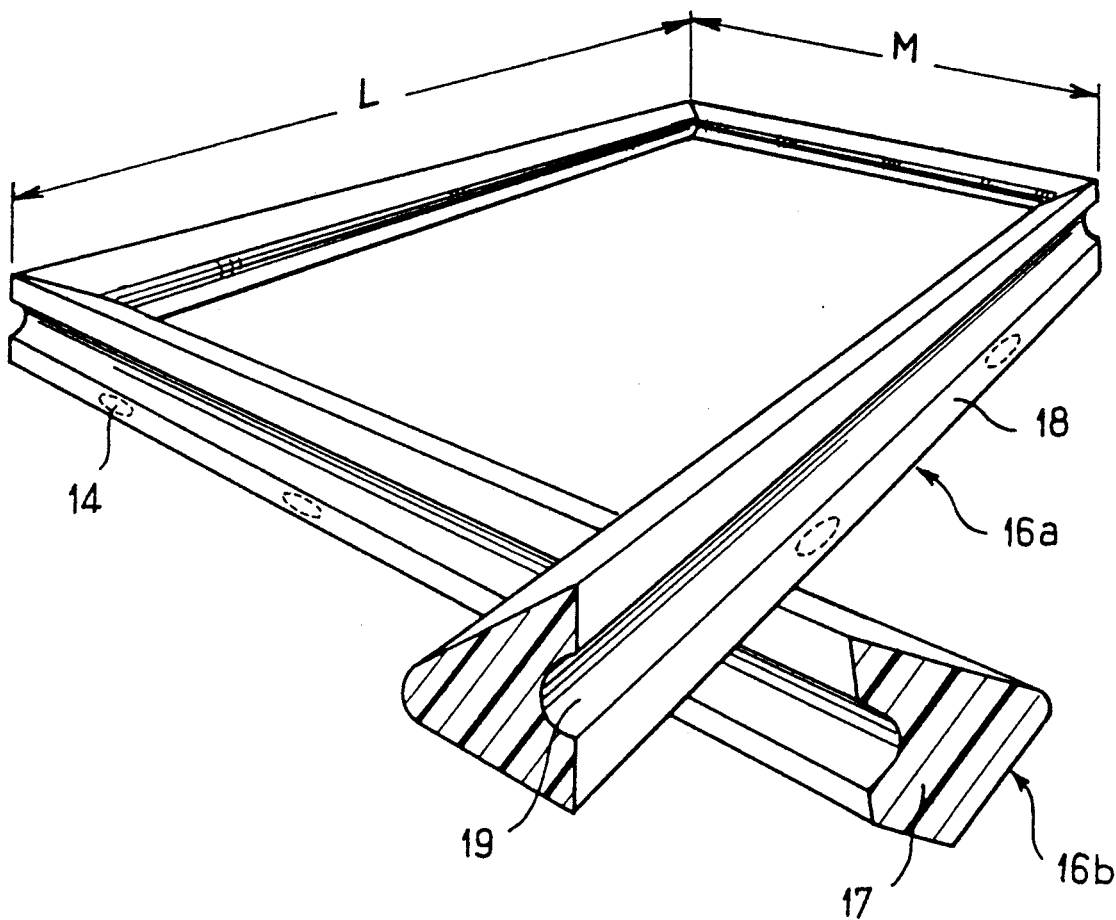

FIG. 1a is a schematic illustration showing a preferred application of the present invention for the flushing of sewer lines with water or cleaning fluid. Shown are the relative positions of a truck, a drum carrying a substantially long flexible hose, and a sewer line. The hose constitutes a very long, flexible article which may be used in the present invention and, as will be discussed more fully below, is preferably equipped with means for the linear measurement of the length, speed or positioning of the hose.

More particularly, a truck, especially equipped for the high pressure cleaning of inaccessible underground sewer lines, at pressures of approximately 100 bar, may include a tank 1 containing water. If desired, appropriate detergents may be added to the water. The water is preferably sent by a compressor 2 toward the hub of a drum 3 by means of a revolving joint (not shown). The revolving joint permits a substantially highly pressurized supply of liquid to a flexible hose 4 regardless of the extent to which the flexible hose 4 is wound up on the drum 3.

The flexible hose 4 preferably has concealed, discrete markings, located at regular intervals, embedded in the thickness of the hose wall. The hose 4 is preferably guided through a detector 5, preferably electromagnetic or magnetic in nature, rigidly mounted to the body of the truck. After a manhole 6 has been opened, the hose 4 is then preferably introduced into the sewer line 7 to be cleaned. A forward end of the hose 4 may thus enter the sewer line 7. The forward end of the hose 4 is preferably equipped with a nose, or mouse 8, having sprayers capable of directing an oblique jet of liquid behind the path of the flexible hose 4. This jet of liquid facilitates the blind progression of the mouse 8 by reaction of the jet against the walls of the sewer line 7; the mouse 8 is usually without any means of control other than an observation of the type and quantity of effluent emerging by gravity, for example, from the constituent sewer 9.

Also, as shown schematically in FIG. 1a, a central processing unit 62 may be connected to detector 5 to convert the information received from the detector 5 into practical data such as the length of hose paid out, the average speed of the hose paid out, or other related data. It should be understood that such a central processing unit 62 may be used in conjunction with other embodiments of the present invention. Furthermore, a more precise description of the use of a central processing unit within a general data acquisition network is discussed further below in relation to FIGS. 9a-11.

By measurement of the length of flexible hose 4 by means of the detector 5, it is possible to pinpoint the position of the mouse 8 in the sewer line 7 and to thereby precisely evaluate the work performed. Such a measurement is preferably accomplished by detecting and counting the discrete concealed markings located in the thickness of the wall of the flexible hose 4. Such a precise assessment of the positioning of the mouse 8, relative to the point of entry of the mouse 8 into the sewer line 7, may also allow for the operation of a safety device when the flexible hose 4 is rolled back up. More particularly, such a safety device may be able to shut off the compressor 2 before the mouse 8 reemerges from the manhole 6 in order to avoid a situation where the action of the high pressure liquid jets is reduced only when the mouse 8 actually leaves the manhole 6, as often tends to occur in actual practice.

More particularly, FIG. 1b, which shows the hose 4 partially retracted from the sewer line 7, illustrates a situation in which the flow of fluid through the high pressure liquid jets may be substantially curtailed or stopped at a point in which the mouse 8 is still substantially within the confines of the sewer 9. As illustrated, the flow of fluid through the mouse 8 has substantially ceased.

FIG. 1c, on the other hand, illustrates the situation which may be avoided through use of the present invention. More particularly, FIG. 1c shows that fluid continues to flow through the high-pressure liquid jets even as the mouse 8 is emerging from the manhole 6. The present invention, if advantageously applied, may result in a situation as shown in FIG. 1b, in which the high-pressure liquid jets may be automatically shut off when the mouse 8 is still further away from the drum 3 at a point which is not substantially visible to an operator.

FIG. 2 is a stepwise partial cut-away view illustrating one possible variant of the means for the linear measurement of length, speed and positioning according to the invention, placed in a flexible hose such as that used in the sewer flushing application described above. It should be understood that the term "stepwise partial cut-away view" is indicative of the manner in which several layers of the flexible hose 4 are shown in FIG. 2. The means in question may be used in other types of flexible tubes, whether or not the tubes are reinforced.

In the variant illustrated in FIG. 2, the flexible hose 4 preferably comprises a number of layers, including: an internal tube 10 preferably made of a polymer compound: a reinforcement layer 11 preferably made of textile material, which has preferably received an adherisation treatment for attachment to adjacent layers; an intermediate layer of polymer compound 12, the composition of which may or may not be identical to that of the polymer compound used for integral tube 10; a second reinforcement layer 13, also preferably made of textile material; and, finally, a covering 15 preferably made of a polymer compound and being substantially resistant to abrasion and to environmental influences. In the variant shown in FIG. 2, the reinforcement layers 11 and 13 are presented in the form of woven fabric. However, it should be understood that the composition of the reinforcement layers 11 and 13 is not necessarily limited to woven fabric.

In the application described above, the means for the linear measurement of length, speed or positioning are preferably in the form of discrete markings consisting of gaps 14a. The gaps 14a may be cut, for example, into a self-adhesive metal film and may be located preferably at substantially regular intervals. In another possible variant, the concealed discrete markings are preferably in the form of pellets 14b cut from a sheet made of conductive polymer compound. The use of pellets made of a polymer compound generally has an advantage over other possible materials in that there results, generally, a better material compatibility between the concealed markings and the components of the flexible hose 4. Preferably, a dynamic magnetic field is detected during passage of the hose 4 past a detector which detector is thence distributed by the presence of the gaps 14a or the pellets 14b embedded in the thickness of the wall of the flexible hose 4.

In the variant illustrated in FIG. 2, the gaps 14a are preferably located between the intermediate layer of polymer compound 12 and the second textile reinforcement layer 13. In such a location, gaps 14a tend to be provided with good adherence, and any risk of slipping during fabrication of the flexible hose 4 is thereby generally eliminated.

In other possible variants which are not illustrated, the concealed markings preferably comprising gaps 14a or pellets 14b, may preferably be disposed at substantially regular intervals either on the internal polymer compound tube 10 before the addition of the firsts textile reinforcement layer 11, or on one of the layers covered either by the intermediate polymer composition layer 12 or by the covering 15 in a subsequent fabrication step.

In any case, the means for the linear measurement of length, speed or positioning, represented here by gaps 14a or pellets 14b, are substantially embedded in the thickness of the wall of the flexible hose 4. Therefore, there tends not to be a risk of the gaps 14a or pellets 14b being eliminated by abrasive wear or modification by chemical or other attack on the polymer compound cover 15. Such chemical modification may result, for example, from atmospheric aging or contact with corrosive liquids.

The means for the linear measurement of length, speed or positioning can replace or supplement external marking systems which external marking systems may make use of paint or ink. Such external marking systems tend to involve the application of paint or ink on the covering 15 of the flexible hose 4. As an example of an external marking which may be used in such an external marking system is indicated at 15a in FIG. 2. This type of system generally facilitates the cutting of the hose, to given lengths, by a retail dealer. Such known marking systems also generally make use of a small wheel for cutting the hose to given lengths. The present invention essentially adds a great deal of precision to external marking systems because, according to the invention, a cut may generally be made on the basis of a magnetic or electromagnetic reading of the concealed markings, such as gaps 14a or pellets 14b.

FIGS. 3a–3d essentially illustrate different applications of the invention to flexible profiles. The means for the linear measurement of length, speed or position shown therein are essentially constituted by discrete concealed markings. Also, these drawings, having cross sectional portions, illustrate the use of the invention in automated processes for marking the length of, or indexing, profiles of various shapes. As will be seen further below, the primary purpose of such marking or indexing is essentially to delineate a predetermined length of the profiles.

FIG. 3a shows profiles 16a and 16b for lining the sides of billiard tables. The profile essentially comprises a high-resilience elastomer compound. A textile covering 18, which has a closely woven texture and does not have a substantial thickness, is preferably provided on certain surfaces of the profile. A substantially semicylindrical groove 19 is preferably indented in one side of the profile. Preferably, the profile 16a, as shown in FIG. 3a, has a substantially triangular cross section with a rounded peak. Profile 16b represents a variant similar to profile 16a, except that one of the corners of the triangular cross section is cut off. For either profile cross section, the profile is preferably provided in multiple lengths of 1.5 meters. For example, in FIG. 3a, the length L of a table, on which the profiles may be disposed, may be about 3 meters, and the width M thereof may be about 1.5 meters.

FIG. 3a also illustrates the inclusion of concealed markings in profiles 16a and 16b. The markings are shown in the form of gaps or pellets 14. Preferably, the gaps or pellets 14 are disposed under the textile covering 18 of the profile, and substantially on one of the plane faces of the profile. Typically, profiles (16a) and (16b) are manufactured in very long lengths. The gaps or pellets 14 thus make it possible to automatically cut profile 16a or 16b, with substantial precision, to a given length. Particularly, in the example shown in FIG. 3a, the profiles 16a and 16b may be cut to the required dimensions of about 1.5 or about 3.0 meters. As may be seen from the drawing, the lengths of profile are also preferably cut with an end angle of 45° so that the cut lengths may be fitted into the corners of the billiard table during installation.

FIG. 3b is a perspective view of a gasket 20 constituting a very long, flexible article. Particularly, the type of gasket shown is generally intended for sealing concrete construction elements such as segments of tunnels or bridges. The gasket 20 is preferably made of an elastomer compound of a composition suitable for the gasket 20 in question. Preferably, the gasket 20 also includes a number of cells 21 oriented in a substantially longitudinal direction. The cells 21 generally improve the deformability of the gasket 20 under compression. Furthermore, the gasket 20 is preferably equipped with a textile reinforcement 22 embedded in the base of the gasket 20. The textile reinforcement 22 is provided to substantially limit the longitudinal deformability of the gasket 20.

In the example of FIG. 3b, the means for the linear measurement of length, speed and positioning preferably comprises a set of gaps or pellets 14 as concealed markings. Preferably, the gaps or pellets 14 are made of metal and are located at regular intervals. Also, the gaps or pellets 14 are preferably positioned within the gasket 20 at the level of the textile reinforcement 22. For cutting the gasket 20 into units of predetermined dimensions, a marking of the lengths of gasket 20 may be advantageously performed by means of a magnetic loop reader device. Particularly, the loop reader device may detect the presence of the gaps or pellets 14 embedded in the thickness of the gasket 20. Since the gaps or pellets 14 have preferably been positioned with a substantial degree of precision, the magnetic loop reader can read the gaps or pellets 14, and may index them to provide an optimization of the cutting of elements of different lengths. In this way, the amount of unusable waste and scrap produced may be substantially minimized, and the operation may easily be automated.

FIG. 3c shows a profile having a cross section substantially in the shape of an equilateral triangle with rounded corners. Such a profile may be cut to a certain length to manufacture wheel shocks 23 for vehicles. The concealed markings constituting the means for the linear measurement of length, speed or position in this application are again advantageously realized in the form of discrete inclusions. The discrete inclusions may be in the form of gaps or pellets 14 located at regular intervals on at least one of the plane faces 24 of the wheel shock 23. The gaps or pellets 14 may be covered by a thin layer of thermoplastic or elastomer polymer compound. As described above, the means for marking length, speed or position are used here for cutting the profiles to given lengths. If necessary, such an operation may be automated.

FIG. 3d is a view of a shock-absorber profile 25 having a cross section 26 substantially in the shape of the Greek letter "delta". The profile 25 shown has been substantially optimized for better absorption of any crushing energy applied to a fastening plane 27. A textile reinforcement 28 is preferably located in the thickness of the base of the shock absorber profile 25. The function of the textile reinforcement 28 is to improve the holding of the profile 25 when the profile 25 is bolted to the fastening plane 27. Also, the textile reinforcement 28 is preferably covered by a layer of elastomer compound, which compound is preferably similar to that found in substantially the entire cross section of the shock absorber profile 25. The application shown in FIG. 3d also preferably includes concealed markings consisting of gaps or pellets 14, preferably made of metal. The gaps or pellets 14 are preferably located at substantially regular intervals and, advantageously, are preferably positioned on the textile reinforcement 28. Being disposed as such, the gaps or pellets 14 are thus substantially covered by the above-mentioned elastomer compound layer, thereby being substantially concealed and substantially protected from the environment. By way of an electromagnetic detection of the gaps or pellets 14, a system of position measurement may be used for cutting the shock absorber profiles 25 to a desired length for retail sale. Thus, the cutting process is generally optimized in that the amount of scrap or waste produced is substantially minimized.

FIGS. 4a and 4b illustrate an application of the means for marking length, speed or position on a very long and flexible article which is also substantially flat. For example, articles of this type may include sheets of rubber marketed in very long rolls, or rolls of certain types of composite cardboard used for printing or packing. FIGS. 4a and 4b, in a stepwise partial cross section, show such a long, flat article as preferably having a top covering 29 and a bottom covering 30. The long, flat article may comprise two intermediate layers of textile reinforcement 31 and 32. In turn, layers 31 and 32 may each be connected by an intimate physical-chemical bonding to another intermediate layer 33. In the case of rubber sheets, the intermediate layer 33 may be made of an elastomer compound having a composition suitable for the rubber sheet in question.

The variant illustrated in FIG. 4a preferably includes concealed markings in the form of small, discrete inclusions. As shown, the concealed markings are preferably in the form of gaps or pellets 14, positioned at substantially regular intervals, in a substantially longitudinal direction, near one edge of the sheet. The means for the linear measurement of length, speed or position thus realized are preferably detected by a local electromagnetic reader. Such a reader is preferably positioned, with a precision required by its sensitivity, to detect and indicate disruptions of the dynamic magnetic field created by the passage, through the reader, of the gaps or pellets 14 aligned with the reader.

FIG. 4b shows a variant of the structure shown in FIG. 4a, in which the concealed markings are realized in the form of transverse bars 34 preferably oriented in a direction substantially transverse with respect to the longitudinal edges of the sheet. The bars 34 may be small bands of a material having high magnetic or electrical conductivity, such as a metal film, and may be several millimeters wide. The bars 34 may also be made of a polymer compound made substantially conductive by the incorporation of metal additives. If the transverse bars 34 are in the form of small metal strips, then the bars 34 are preferably made of a substantially thin film so as generally not to modify the mechanical behavior of the very long flexible article, or the sheet material, during use. If the transverse bars 34 are made in the form of small bands of conductive polymer compound, they are also preferably thin. In the latter case, however, it should be appreciated that the thickness of the bars 34 may have less of an influence on the mechanical behavior of the sheet material. This lessened influence is substantially due to a greater homogeneity of material between the layers of the very long, flat article and the concealed markings, or bars 34.

The transverse bars 34 are preferably located at substantially regular intervals along the length of the very long, flexible article. Additionally, the bars 34 may be disposed in any of the following locations within the thickness of the very long, flexible article: between the top covering 29 and the layer of textile reinforcement 31; between the textile reinforcement layer 31 and the intermediate layer 33; between the intermediate layer 33 and the reinforcement layer 32; or between the textile reinforcement layer 32 and the bottom covering 30. The transverse bars 34 preferably have a length so as to occupy substantially the entire width of the very long, flexible article.

FIG. 4b also shows a variant in which the concealed markings may be shorter transverse strips 35 which occupy a substantial portion of the width, but generally not the entire width, of the very long, flexible article. The short transverse strips 35 are also preferably located at substantially regular intervals along the length of the very long, flexible article. Additionally, the strips 35 may be disposed in any of the following locations within the thickness of the very long, flexible article: between the top covering 29 and the layer of textile reinforcement 31; between the textile reinforcement layer 31 and the intermediate layer 33; between the intermediate layer 33 and the reinforcement layer 32; or between the textile reinforcement layer 32 and the bottom covering 30.

The transverse bars 34 and the shorter transverse strips 35 shown in FIG. 4b tend to have an advantage over the gaps or pellets 14 shown in FIG. 4a in that a particular positioning of an electromagnetic reader in a substantially lateral direction in relation to the very long, flexible article is generally not required. Primarily, this is due to the fact that the detection of the disruption of the dynamic magnetic field is generally accomplished in a substantially vertical direction, either above or below the very long, flexible article, across a space left available by the installation of the electromagnetic reader.

The means for the linear measurement of length, speed or position in the variants shown in FIGS. 4a and 4b allows not only for the long, flexible article to be cut to particular lengths specified by a manufacturer or user, but also for the marking of may intermediate dimensions. For example, such intermediate dimensions may be used in the bending or folding of paper, of cardboard, or of composite, multi-layer packaging films. Additionally, the means for the linear measurement of length, speed or position may also allow for controlling the sped of travel of the long, flexible article. Such speed control may be used both during fabrication, to allow for a substantially direct control of production, and during transformation phases located further downstream on an assembly line, to allow for the counting of the units of product manufactured. Thus, if an electromagnetic reader being utilized with the present invention is connected to appropriate computer equipment, a substantially direct logistical control of the production, from the supply of initial components to the delivery of the finished products, may result.

As repeatedly mentioned above, sensors are preferably used to detect the passage of any concealed markings, such as gaps or pellets 14, transverse bars 34 or short transverse strips 35. These concealed markings, as they traverse a substantially hollow coil preferably included in the electromagnetic sensor, are generally not subjected to a homogeneous magnetic field. Preferably, a sensor used with the present invention has a sensitivity appropriate to the substantially vertical distance between the substantially horizontal plane on which the concealed markings are located and the substantially horizontal plane on which the sensors are located. Due to numerous factors, this substantially vertical distance may vary. However, such a variation of the substantially vertical distance generally does not cause any particular problems, because only a disruption of the dynamic magnetic field need generally be detected, and not the intensity of the magnetic field.

Figure 5A:
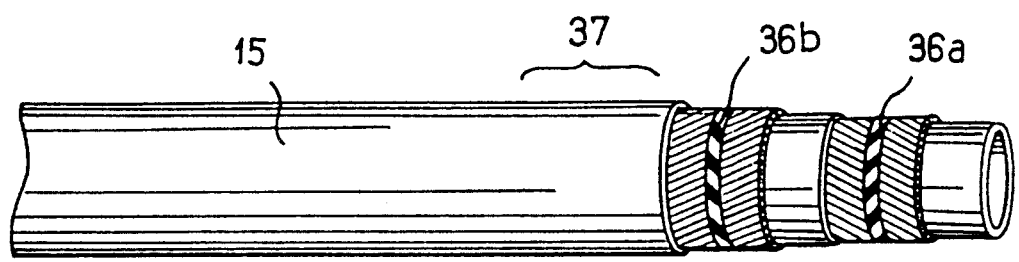
FIGS. 5a and 5b illustrate two variants of the means for the linear measurement of length, speed or position applied to flexible hoses, in which the variant of FIG. 5a makes use of discrete concealed markings, and the variant of FIG. 5b makes use of continuous concealed markings.
Figure 5B:
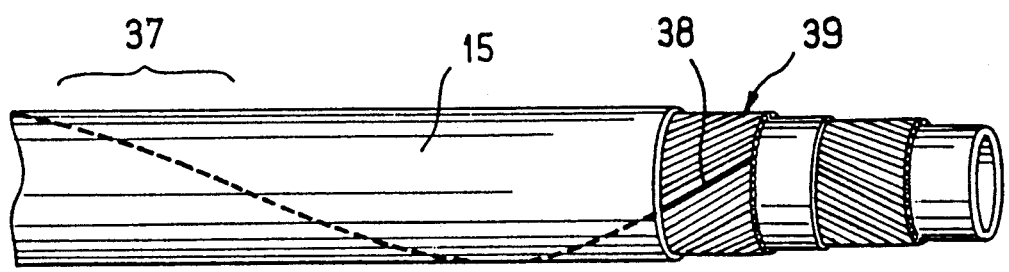

FIGS. 5a and 5b illustrate an application of the present invention to flexible hoses. Shown are two variants of the means for the linear measurement of length, speed or positioning, in which one variant substantially comprises discrete concealed markings and the other comprises continuous concealed markings. In both cases, the flexible hoses 37 preferably have a structure substantially similar to that of the hose 4 shown in FIG. 2.

FIG. 5a shows an application of discrete linear markings disposed in a substantially transverse, or circumferential direction. Such markings may be in the form of rings 36a preferably made of metal. The markings may also be in the form of bracelets 36b. The rings 36a or bracelets 36b may be located on an intermediate layer of the flexible hose 37. Preferably, concealed markings are placed under the covering 15 of the flexible hose 37 in the form of a rings 36a. Rings 36a, are preferably made of a substantially self-adhesive metal film. Also, a substantially closed ring is preferably formed in each case, wherein the extremities of the ring 36a may or may not overlap.

The concealed markings of the present invention may also be advantageously realized by a bracelet 36b made of a polymer compound, to which a quantity of conductive material has preferably been added. In this way, the bracelet 36b may have a formulation substantially similar to the material used in the flexible hose 37 with which the bracelet 36b is in contact. Therefore, the material compatibility between the bracelet 36b and the components of the flexible hose 37 may be increased. The extremities of the bracelet 37b may be disposed to either overlap for a substantially short distance, to touch each other, or not to touch at all.

In the variant shown in FIG. 5a, the disruption of a dynamic magnetic field may be detected either by means of a coil through which the flexible hose 37 passes, or by a sensor disposed in a substantially lateral direction with respect to the hose 37.

FIG. 5b illustrates one variant in which a detection of a disruption of a dynamic magnetic field is generally possible only by means of a lateral sensor; a coil would tend only to detect a substantially continuous signal from an object passing through the coil. Such a substantially continuous signal could thus generally not be used for any measurement. In this variant, a substantially continuous marker 38 is preferably coiled in a spiral fashion and inserted in the flexible hose 37 during manufacture. The marker 38 may substantially consist of a metal wire. Additionally, the marker 38 is preferably substituted for a wire used in a reinforcement layer 39. Therefore, when the reinforcement layer 39 is covered by the covering 15 during the manufacture of the flexible hose 37, the continuous spiral marker 38 becomes substantially concealed.

Figure 6:
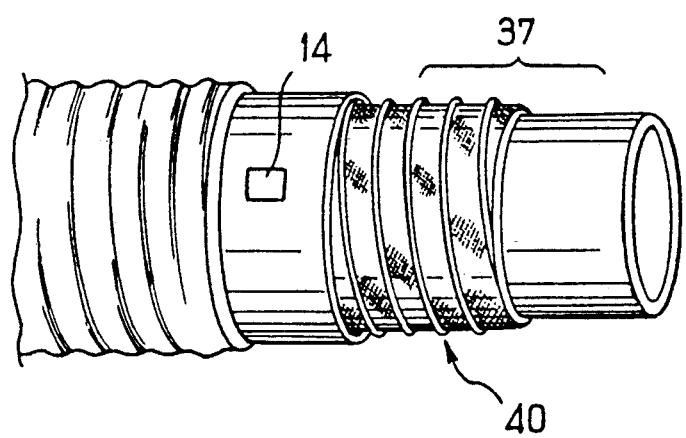
FIG. 6 illustrates a possibility of using the means for the linear measurement of length, speed or positioning, in the form of discrete concealed markings located within a very long, flexible article such as a tube which includes a continuous metal armature.

FIG. 6 shows a flexible hose 37 in which the design thereof preferably includes a metal reinforcement spiral 40 inserted during assembly of the hose 37. The pitch of this reinforcement spiral 40 is preferably determined on the basis of mechanical resistance to crushing and collapsing in the presence of an underpressure, while simultaneously ensuring a substantial degree of flexibility for the flexible hose 37. It is apparent that, in such a hose 37, the use of a means for measuring length, speed or rotation by means of a lateral sensor may be employed under the same conditions as for the flexible hose 37 shown in FIG. 5a. More particularly, the signal processing system may be adapted to take the pitch of the spiral 40 into consideration. If necessary, this reading by means of a lateral sensor may be combined with a detection of gaps or pellets 14. The gaps or pellets 14 may be disposed throughout the flexible hose in a manner similar to that found in some of the previously described variants of the present invention. To detect the gaps or pellets 14, the flexible hose 37 may be passed through the hole of a magnetic coil. The gaps or pellets 14 may be located at a very different interval, thereby allowing for the periodic activation of a counter based on the passage of the turns of the metal reinforcement spiral 40. The pitch of the spiral 40 is preferably small in relation to the diameter of the flexible hose 37.

Figure 7:
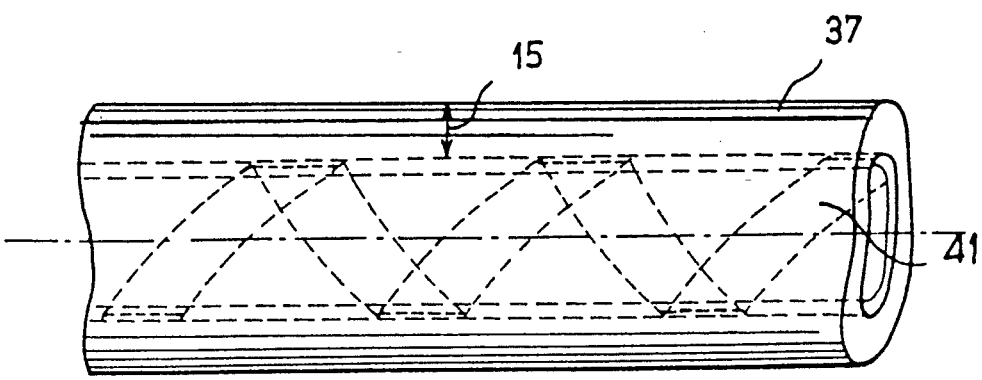
FIG. 7 illustrates an application of a strip made of a conductive polymer composition to constitute continuous, concealed markings in a very long, flexible article such as a hose.

FIG. 7 shows a technological variant of the flexible hose 37, wherein a measurement of length may be performed by a lateral sensor detecting the presence of a spiral wound continuously about the flexible hose 37. During assembly, the flexible hose 37 is preferably equipped with a continuous concealed marking 41 in the form of a spiral. This spiral marking 41 preferably has a high electrical or magnetic conductivity in relation to that of the flexible hose 37. The spiral marking 41 may be disposed in any one of the internal layers of the hose 37, but is preferably disposed in the layer closest to the outer surface of the hose 37, that is, preferably under the covering 15.

The continuous concealed marking in the form of a spiral 41 may be in the form of a thin, narrow metal film or of a ribbon. If the form of a metal film is used, the metal film is preferably, but not necessarily, self-adhesive. If the form of a ribbon is used, the ribbon is preferably several millimeters wide and does not have a substantial thickness. Additionally, the ribbon is preferably made of a polymer compound made conductive by the incorporation of appropriate additives.

During assembly of the flexible hose 37, the continuous concealed marking in the form a spiral 41 is preferably placed on a component having a substantially smooth surface. Also, the spiral 41 is preferably given a pitch which is substantially independent of a pitch corresponding to an equilibrium angle of the reinforcement layers of the flexible hose 37.

In one variant, the continuous concealed marking in the form of a spiral 41 may be a ribbon made of a conductive polymer compound. This would tend to provide an advantage over a variant in which the spiral marking (41) is in the form of a metal film, in that the ribbon would have a composition substantially similar to that of the polymer components of the flexible tube 37. Therefore, the ribbon would be substantially physically compatible with the polymer components of the tube 37, and therefore, would not generally modify the intrinsic performance of the flexible hose 37.

Figure 8A:
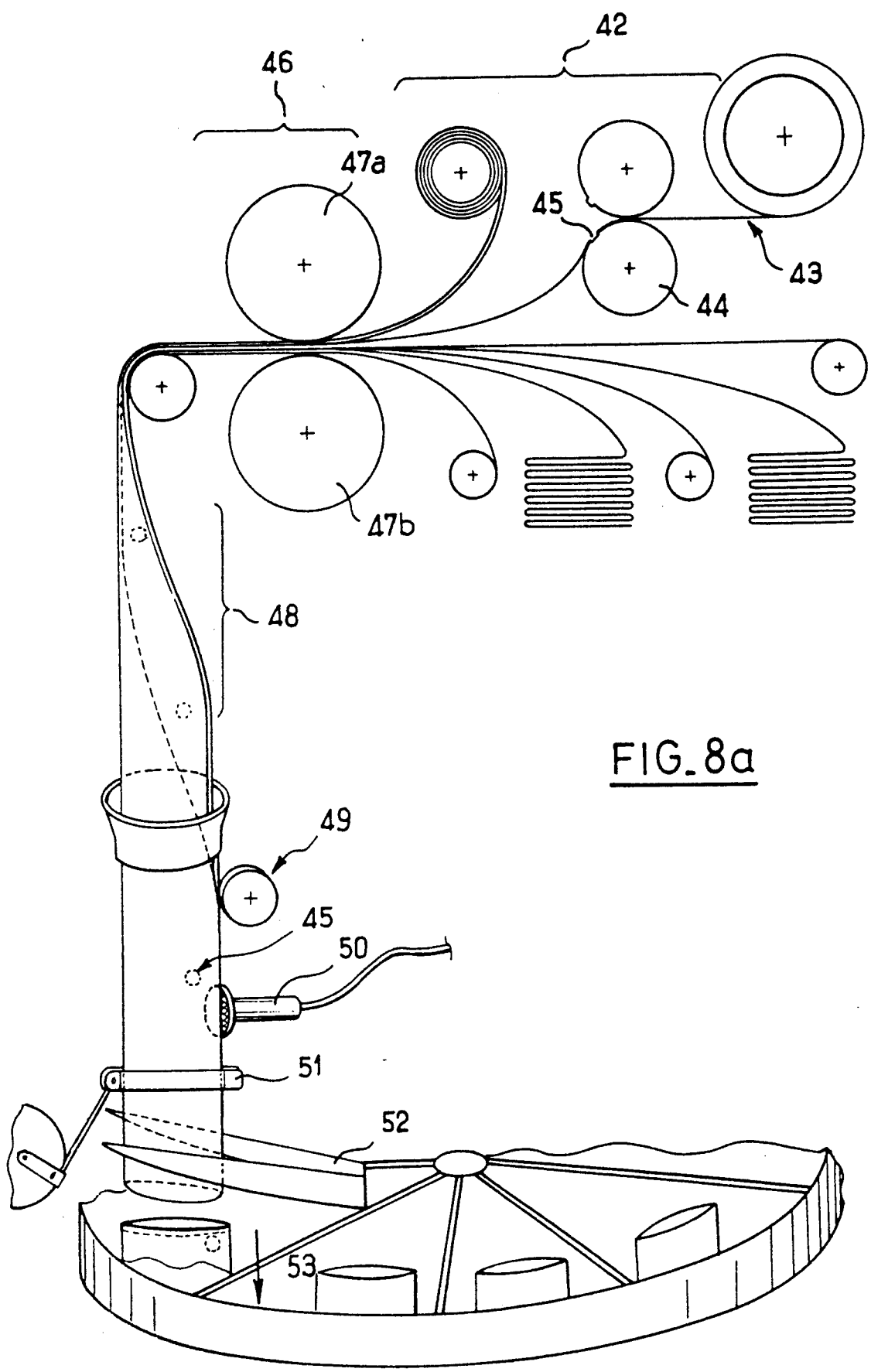

FIGS. 8a-8c illustrate a preferably application of the means for the linear measurement of length, speed or position in the manufacture of a very long, flexible article comprising composite material in several layers. In this application, at least one of the internal layers of the very long, flexible article preferably includes a material having high electrical or magnetic conductivity. Such a material may be a thin metal film or a sheet of conductive polymer compound. In either case, the concealed markings are preferably discrete and are essentially in the form of deliberately introduced gaps.

The very long flexible article in the variant of FIGS. 8a-8c is preferably composed of a superimposition of at least three layers. One internal layer is preferably a thin metal film, such as an aluminum film, or a sheet of conductive polymer compound.

Because of so-called "barrier properties" and other physical characteristics such as thermal conductivity, a composite material as shown in FIG. 8a may be used as a packing material. The material may be in the form of sheets or, as shown, in the form of a thin-walled tube. Particularly, such a composite material is preferably used in the manufacture of containers for liquids or powders. Such containers may be in the form of tetrahedron-shaped containers or bricks. It should be noted that such tetrahedron-shaped containers are similar to certain types of juice boxes. The containers are preferably formed such that, after any necessary bending and folding, they are preferably closed by on-line heat sealing and cut with substantially precise indexing in relation to continuously printed inscriptions on the surface of the tube or composite sheet.

A linear measurement of length, speed or positioning may be applied which is substantially independent of any markings made on the surface of the material. Such markings would tend to vary as a function of the fabrication conditions. Therefore, a detection system based on such markings may not be reliable. Rather, in accordance with the present invention, the measurement sought may be made possible by detection, using an electromagnetic reader. As mentioned repeatedly above, such a reader preferably detects disruptions of the dynamic magnetic field of the composite material. In this case, such disruptions may be caused by the presence of deliberately created gaps in the internal layer of the composite material, whether the layer is constituted by a thin metal film or a conductive polymer compound sheet. The detection of the disruptions of the dynamic magnetic field may also allow for the indexing of the edge heat sealing machines which seal the edges of the containers. Furthermore, such detection may also allow for the positioning of the surface markings used for bending and cutting the strip into individual containers, even though the speed of travel of the composite material may vary.

FIG. 8a shows an entire device for the fabrication of individual containers such as those described above. The device preferably starts with flexible components assembled in a storage zone 42. One component procured from a roll is a conductive film 43 preferably comprising a thin metal film, possibly made of aluminum, or a sheet of conductive polymer compound. A punching device 44 is preferably disposed on a roller to roll over the conductive film 43. As a result, punching device 44 may thereby cut out and remove a quantity of pellets to form a quantity of deliberately created gaps 45 in the conductive film 43. These gaps 45 are then substantially concealed during what may be the next phase of fabrication, in which additional layers are preferably superimposed upon the conductive film 43. This step may be carried out in an assembly zone 46. Assembly zone 46 preferably includes two press rollers 47a and 47b which preferably press together upon a multi-layer stack formed from the superimposition of various layers. In this way, a composite material may be created. By passage through a bending and shaping zone 48, the composite material may then be transformed into a substantially tubular shape. The composite material is then preferably closed by a heat sealing device 49.

The travel of the newly formed thin-walled tube may be guided past an electromagnetic sensor 50. The electromagnetic sensor may be located downstream of the heat sealing device 49, as shown, or possibly upstream of the device. The sensor 50 preferably detects disruptions of the dynamic magnetic field of the composite material caused by the presence of the deliberately created gaps 45. Therefore, on the basis of the moving composite material and the detection of the gaps 45 thereof, an indexing may be provided for an end clamp 51 and for a shear 52. The shear 52 is preferably disposed to cut the composite material to a length required for an individual container. In a filling and closing zone 53 preferably disposed yet further downstream, the composite material, in the form of a very long, flexible article, is thereby transformed into unit containers. The containers are then discontinuously fitted and hermetically sealed. The deliberately created gaps 45 are shown as having a circular shape, but may also be in the form of an oval, a rectangle or any suitable geometric shape. The gaps 45 are preferably present in the conductive film 43 serving as a barrier material in the multi-layer composite material. It is generally desirable that the gaps 45 not interfere with the sealing function of the barrier material. Therefore, to this end, the gaps 45 may be located substantially on the edge of the conductive film 43, in the heat sealing zone which closes the tubular shape. More particularly, as a result, it may be possible to use the means for the linear measurement of length, speed or positioning even after complete assembly of the unit containers has been realized. For example, the measuring means may be used for counting the containers.

Another possibility for substantially avoiding disruption of the sealing function of the conductive film 43 is to place the deliberately created gaps 45 essentially in the edges of the conductive film 43. In that zone, the bending will subsequently be performed, and, above all, the cutting by the shear 52, of the product into individual containers, will be performed. The zone containing the deliberately created gaps 45 is preferably removed during the cutting process, and the means for the linear measurement, by detection of the disruptions of the dynamic magnetic field, may then no longer be used downstream of the shear 52 which cuts the strip into individual containers.

FIG. 8b shows a multilayer composite material in which the gaps deliberately created in the conductive film are preferably in the form of transversely disposed slots 54. Preferably, the slots 54 are substantially concealed by the upper or lower layers of the multilayer composite material over part or all of the length of the slots 54. The advantage of this arrangement is that a precise alignment of the transverse slots 54 with the electromagnetic sensor 50 is generally no longer required for the detection of disruptions of the dynamic magnetic field of the multilayer composite material, the shape of the final unit container essentially makes such an arrangement possible.

Variations in the dimensions or in the distance between the transverse slots 54 may be possible in this application if the detection of the disruptions of the dynamic magnetic field is used to substantially activate alternating-motion fabrication equipment, such as the end clamp 51 and the shear 52 which cuts the strip into individual containers.

By modifying the distance between the deliberately created gaps 45 or the transverse slots 54, the punching device 44 generally allows for the fabrication of individual containers of different lengths in a continuous multilayer composite material. In this way, the operational flexibility of the production equipment may be increased.

FIG. 8c illustrates a possible example of an individual container 55, after substantial completion of all of the fabrication steps, from the stacking of the layers, including the conductive film 43 containing the deliberately created gaps 45 or the transverse slots 54, to the filling and hermetic sealing of the containers.

FIGS. 9a, 9b, 10 and 11 illustrate various possible means for the detection and/or processing of the disruptions of a dynamic magnetic field of a very long, flexible article.

FIG. 9a is a schematic illustration of a device for magnetic detection and for data processing. The device preferably operates as a magnetic loop, and may be used for very long, flexible articles containing concealed markings. However, the cross sectional dimensions of the article should generally be of a size compatible with the detection device. Detector 5 preferably has a small-clearance passage 64. The passage 64 preferably includes the magnetic loop through which the very long, flexible article, preferably having a limited cross section, may pass.

FIG. 9a is also a perspective view of the housing containing the detector 5 necessary for the measurement of the disruptions of the dynamic magnetic field induced by the passage of the very long, flexible article 4 through the electromagnetic loop. As mentioned above, the disruptions are generally created by the presence of the concealed markings, embedded in the thickness of the wall of the very long, flexible article 4. The heavy-duty equipment shown in FIG. 9a is preferably portable, to allow for its transportation for its possible use on a construction vehicle or in a shop. Preferably, the detector 5 has two indicator lights 56. The indicator lights 56 preferably indicate the proper operation of the detector 5 as well as the detection of the disruption of the dynamic magnetic field by the passage of the concealed markings. If necessary, the detector 5 may also have an acoustical signal to allow the operator to monitor the progress of the operation without constantly looking at the apparatus.

In particular, in addition to possible data processing, the device, in combination with the present invention, may allow for other capabilities. For example, a simple change in the interval between the concealed markings may easily be made during fabrication. Preferably, such a change may be made in the final few meters on the roll of the very long, flexible article. In this way, the final few meters of the very long, flexible article may trigger the simple acoustical alarm with a modified frequency. Therefore, an operator may be alerted to the passage of the final meters of the material of the very long, flexible article.

However, the essential advantage of the device may reside in the possibility of the computer processing of a signal received by the device. More particularly, an electronic portion of the device, preset to a desired sensitivity, preferably sends a signal to a data acquisition unit every time the dynamic magnetic field is substantially disrupted by the passage of a concealed marking through the magnetic loop of the detector 5. Here, in FIG. 9a, a concealed marking is represented by a gap 14. The electronic portion of the device may be located near the detector 5 if the environment so permits, or may be located remotely, in a location less exposed, since the operational data thereby received may be processed either immediately or on a delayed basis. For example, in the aforementioned application of the invention to the flushing of sewer lines, the computer processing of data may allow for an immediate adjustment of the operating conditions and for substantially complete logistical tracking. Such an immediate adjustment of operating conditions may relate to the winding or unwinding speed of the drum in order to establish a constant speed of travel of the hose, regardless of the change in the diameter of the hose coil. Thereafter, a continuous control of the entry of the hose into the underground sewer line may be allowed. Additionally, an interruption of the liquid pressure when the hose leaves the sewer line may also be possible. The above-mentioned logistical tracking may relate to the following: management of the elapsed time; assessment of the amount of cleaning fluid used to clean a sewer line;

immediate, on-site preparation of a bill upon completion of a cleaning operation; and retention of data for any comparative study of operations performed at different periods.

By identifying a cleaning operation on a keyboard, an on-board central processing unit may compare a number of successive interventions at a particular sewer cleaning location, thus allowing for an automatic adjustment of hose lengths or other parameters related to sewer cleaning treatments. For example, the speed of advance of the hose in the sewer line may be modified. Additionally, the water pressure may be modified at designated positions.

It should also be noted that, in utilizing the present invention, services performed for third parties may be characterized by what may be termed a "transparency of operations". Such a transparency of operations may arise simply from the existence of a means for recording and processing information. The automatic printing of reports, as well as the preparation of invoices or any document facilitating decision-making, may thus become possible in an immediate time frame, on the site of the operation itself.

At substantially no additional expense, the technology for the placement of the concealed markings, during the fabrication of the very long, flexible article, allows for the incorporation of identification messages by placing individual tags in determined locations. If necessary, the identification messages may be coded.

FIG. 9b illustrates an example of a commercially available central processing unit 62 which, because of its heavy-duty nature, may be suitable for the following tasks: tracking the logistics of the fabrication of a material, cutting the material to length, transforming the material in the factory, using the very long, flexible article, and allowing for the operational management of the very long, flexible article on site. For example, a digital display in a window 57 may allow for a measurement of lengths unrolled. Either by using a double magnetic loop, or by operating a drum control lever, any ambiguity concerning the direction of progression of the very long, flexible article may thereby be eliminated. Additionally, the equipment essentially allows for the precise display of the length unrolled from the drum.

A digital keypad 58 may be provided to allow the operation to be displayed on a screen 59, and thus may allow a comparison with parameters stored in memory. Such data processing therefore allows for substantially direct management, on the production site, of the fabrication of the very long article. This management may encompass the measurement of the lengths fabricated, the positioning of the surface markings, the tracking of the fabrication components, the possible bending or cutting of the article to unit lengths with optimization to reduce waste, and, possibly, even the maintenance of inventories. In a substantially similar way, the data processing essentially allows for the tracking of the very long, flexible article during operation, on the site of actual use, and essentially allows for the scheduling of maintenance operations and servicing, after sale, during the service life of the very long, flexible article.

FIG. 10 illustrates the use of a lateral pickup instead of a magnetic loop. A lateral pickup may be necessary for applications where reading by means of a magnetic loop is essentially impossible, either because of the dimensions of the very long, flexible article, or because of the type, location or dimensions of the concealed markings. In the variant shown, the lateral pickup 60 is substantially similar to the type used for the detection of the passage of metal particles in handling installations. A flexible composite sheet 61, such as a packing film having a barrier layer, is preferably provided with concealed markings, such as transverse bars 34. A signal is preferably issued by the lateral pickup 60 in response to the disruptions of the dynamic magnetic field of the flexible composite sheet 61 by the transverse bars 34. Preferably, the signal is received in a central data processing unit 62, where the signal is processed qualitatively as an electrical value exceeding a determined threshold. Therefore, the signal is generally independent of the distance between the lateral pickup 60 and the flexible composite sheet 61. If that distance were to fluctuate during the movement of the sheet 61, the conditions of the magnetic field, included by the concealed markings constituted by the transverse bars 34, would tend to change.

The operation of the assembly consisting of the lateral pickup 60 and the central data processing unit 62 of the present variant is substantially similar to that of the assembly consisting of the detector 5 and the central data processing unit 62 in FIGS. 9a and 9b. Also, the assembly shown in FIG. 10 essentially offers the same advantages as the assembly shown in FIGS. 9a and 9b.

FIG. 11 is a schematic diagram of the computer analysis of the electrical signals emitted by a loop pickup, such as that found in the aforementioned detector 5, or by a lateral pickup. Both pickups are essentially based on the induction resulting from the emission of an alternating magnetic field. The frequency of the magnetic field is preferably selected in order to substantially minimize any sensitivity to parasites in the environment, either in the production facility or at the operating site.

Being essentially based on the saturation of the induced magnetism, the measurement of the electrical message received is relatively independent of the magnetic field emitted, as long as the strength of the emitted magnetic field generally exceeds a predetermined threshold. A transmitter loop 63, preferably located around the low-clearance passage 64, is preferably disposed concentrically with respect to a receiver loop 65. In the absence of a magnetic core, the weak signal received can easily be compensated in central data processing unit 62, which unit eventually receives the electrical values emitted by two receiver loops 65 to detect the direction of progress of the very long, flexible article.

In response to an identification message introduced, for example, on the digital keypad 58, the central data processing unit 62 translates the received electrical value into a quantity such as the number of meters unrolled, which may then be displayed in window 57. This electrical message and any processing which takes these data into consideration may also be stored in the memory of the central data processing unit 62 or on a magnetic disk 67. Additionally, data may be recorded on paper by means of a printer 66.

The means for the linear measurement of length, speed or positioning, consisting of continuous or discrete, concealed markings embedded in the thickness of the wall of a very long, flexible article, as disclosed by the present invention, essentially has the following advantages:

it is generally easy to use with the very long, flexible article, regardless of the cross section of the article, and generally does not interfere with the fabrication steps;

it essentially does not change either the appearance or the physical and mechanical characteristics of the very long, flexible article;

it allows for a marking, which, because of its being substantially concealed, may remain secret; thus, concealed identification elements may be provided to identify batches of the very long, flexible article, the production date, the production facility, etc.;

it essentially constitutes a means for the operation of production, bending and cutting machines for the very long, flexible article, by indexing in relation to the components;

it generally only uses commercially assailable detectors or pickups for the detection of the disruptions of the dynamics magnetic field of the very long, flexible article, and generally does not require any sophisticated adaptation;

it is generally heavy duty and inexpensive, and can essentially be used both in the production plant and on the operating site;

when connected to appropriate data processing means, it generally allows for the computerization of manufacturing operations, from the measurement of the lengths of material produced to the tracking of inventories, including the control of substantially all the intermediate steps; and when connected to means of the same type, it also generally makes possible, on site, the direct logistical analysis of the services provided and the scheduling of maintenance.

A technician skilled in the art may, of course, combine the different variants of concealed markings presented herein, as well as their arrangement and location in the wall thickness of the very long, flexible article, without essentially going beyond the context of the invention.

To briefly recapitulate, the present invention is directed to means for the linear measurement of length, speed or positioning, characterized by the fact that it comprises concealed markings embedded in the thickness of the wall of a very long, flexible article, to create, when read by appropriate pickups, a disruption of the dynamic magnetic field detected. The very long, flexible article may be prismatic or cylindrical in shape.

In summary, one feature of the invention resides broadly in the means for the linear measurement of length, speed or positioning, characterized by the fact that it consists of concealed markings 14a, 14b, 34, 35, 36a, 36b, 38, 41, 45 or 54, embedded in the thickness of the wall of a composite very long, flexible article. This article has a prismatic or cylindrical shape, to create, when read by means of appropriate pickups, a disruption of the dynamic magnetic field detected.

Another feature of the invention resides broadly in the means for the linear measurement of length, speed or positioning, characterized by the fact that the concealed markings 14a, 14b, 34, 35, 36a or 36b, 45 or 54 are discontinuous.

Yet another feature of the invention resides broadly in a means for the linear measurement of length, speed or positioning, characterized by the fact that the concealed markings 38 or 41 are continuous.

A further feature of the invention resides broadly in a means for the linear measurement of length, speed or positioning, characterized by the fact that the concealed, discontinuous markings consist of thin metal gaps 14a, and are located longitudinally between two components of the very long, flexible article.

A yet further feature of the invention resides broadly in a means for the linear measurement of length, speed or positioning, characterized by the fact that the concealed, discontinuous markings consist of pellets 14b, made of a polymer compound containing conducting particles, and are located longitudinally between two components of the very long, flexible article.

Yet another further feature of the invention resides broadly in a means for the linear measurement of length, speed or positioning, characterized by the fact that the concealed, discontinuous markings consist of individual gaps 45 created deliberately in a thin metal film, located longitudinally between two components of the very long, flexible article.

An additional feature of the invention resides broadly in a means for the linear measurement of length, speed or positioning, characterized by the fact that the concealed, discontinuous markings consist of individual gaps 45 created deliberately in a sheet of conductive polymer compound located between two components of the very long, flexible article.

A yet additional feature of the invention resides broadly in a means for the linear measurement of length, speed or positioning, characterized by the fact that the concealed, discontinuous markings consist of thin metal rings 36a oriented perpendicular to the axis and embedded between two components of the very long, flexible article.

A further additional feature of the invention resides broadly in a means for the linear measurement of length, speed or positioning, characterized by the fact that the concealed, discontinuous markings consist of bracelets 36b made of polymer compound containing conducting particles, oriented perpendicular to the axis and embedded between two components of the very long, flexible article.

A yet further additional feature of the invention resides broadly in a means for the linear measurement of length, speed or positioning, characterized by the fact that the concealed, discontinuous markings consist of thin transverse bars 34, located between two components of the prism-shaped, flexible, very long, article, of which they occupy the entire width.

Another further additional feature of the invention resides broadly in a means for the linear measurement of length, speed or positioning, characterized by the fact that the concealed, discontinuous markings consist of transverse strips 35 located between two components of the prism-shaped, very long, flexible article, of which they occupy a portion of the width.

A yet another additional feature of the invention resides broadly in a means for the linear measurement of length, speed or positioning, characterized by the fact that the concealed, discontinuous markings consist of transverse slots 54, deliberately created in a thin metal film, located between two components of the prism-shaped, very long, flexible article, the transverse slots 54 extending over all or part of its width.

Another yet further feature of the invention resides broadly in a means for the linear measurement of length, speed or positioning, characterized by the fact that the concealed, discontinuous markings consist of transverse slots 54, deliberately created in a sheet of conducting polymer compound, located between two components of prism-shaped, the very long, flexible article, the transverse slots 54 extending over all or part of its width.

A still further feature of the invention resides broadly in the means for the linear measurement of length, speed or positioning, characterized by the fact that the concealed, continuous markings consist of a spiral 38 or 41 located, by banding or spiral winding of a thin metal wire or strip, between two components of the very long, flexible article.

A still further additional feature of the invention resides broadly in a means for the linear measurement of length, speed or positioning, characterized by the fact that the concealed, continuous markings consist of a spiral 41 located, by banding or spiral winding of a conductive polymer compound strip, between two components of the very long, flexible article.

Another still further feature of the invention resides broadly in a flexible hose 4, characterized by the fact that it comprises, between two components such as a reinforcement layer 11 or 13 and its internal tube 10, or an intermediate layer 12 or its covering 15, a means for the linear measurement of lengths, speed or positioning. This makes possible, by means of reading with appropriate pickups, the management of its fabrication, the automation of its cutting to specified lengths and the analysis of the operating conditions on site.

Yet another still further additional feature of the invention resides broadly in flexible profiles such as linings for billiard tables 16a or 16b or gaskets 20 or wheel shocks 23 or shock-absorber profiles 25, characterized by the fact that they comprise, embedded in the thickness of their wall between two of their components, a means for the linear measurement of length, speed or positioning. This makes possible, when read by appropriate pickups, the management of their fabrication and their cutting to specified lengths.

Still another yet further additional feature of the invention resides broadly in a multilayer composite packing material, characterized by the fact that it comprises, between two layers, a means for marking length, speed or positioning. This makes possible, when read by appropriate pickups, the regulation of the flexible container fabrication equipment or of bending or cutting machines.

Examples of electromagnetic detectors, which may be used with the embodiments of the present invention, may be found in U.S. Pat. No. 4,992,733, entitled "Position Sensing Transducer Having a Circular Magnet with an Integral Flux Distorting Member and Two Magnetic Field Sensors", issued Feb. 12, 1991; U.S. Pat. No. 4,968,156, "Bearing with a Magnetic Field Sensor", Nov. 6, 1990; and U.S. Pat. No. 4,870,360, "Apparatus for Identifying an Electrically Conducting Material", Sep. 26, 1989.

Examples of other types of detectors, which may be used with the embodiments of the present invention, may be found in U.S. Pat. No. 4,853,617, entitled "Apparatus Having Capacitive Sensor and Metal Detector for Detecting Objects Concealed behind Surfaces", issued Aug. 1, 1989; U.S. Pat. No. 4,882,536, "Capacitive Detector of Position Having Electrodes and Circuitry Formed on a Common Integrated Circuit; U.S. Pat. No. 4,879,508, "Capacitance-type Measuring Device for Absolute Measurement of Positions"; U.S. Pat. No. 4,939,561, "Infrared Sensor", Jul. 3, 1990; U.S. Pat. No. 4,864,378, "Schottky Barrier "Infrared Detector", Sep. 5, 1989; U.S. Pat. No. 4,679,063, "Infra Red Detectors", Jul. 7, 1987; U.S. Pat. No. 4,594,547, "Mark-space Amplitude Modulator for Measuring Reactive Power Consumption or Reactive Energy Consumption", Jun. 6, 1986; and U.S. Pat. No. 4,454,471, "Electronic Arrangement for Determination of Reactive Power", Jun. 12, 1984.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hose comprising:
   an external surface portion;
   an internal portion being disposed substantially within said external surface portion;
   marking means disposed substantially within said internal portion, said marking means being disposed over a length of said hose;
   said marking means being configured for being detected by sensing means at least for measuring a length of said hose;
   said marking means comprising a continuous conductive film and a plurality of gaps being cut into and disposed within said conductive film;
   said conductive film being configured for being detected by sensing means;
   said plurality of gaps comprising orifices being cut into and disposed within said conductive film;
   said conductive film being continuously conductive between a plurality of said gaps; and
   said plurality of gaps being spaced apart and disposed over a length of said hose for being detected by the sensing means at least to measure a length of said hose;
   said conductive film comprising a metal conductor;
   said internal portion comprising a plurality of coaxial cylindrical layers;
   said conductive film being disposed between two of said layers;
   said conductive film being self-adhesive and being adhesively attached to at least one of said layers of said internal portion;
   said conductive film having an electrical conductivity substantially higher than that of other components of said hose;
   said conductive film having an electrical conductivity about 10 times higher than that of other components of said hose;
   said plurality of gaps being disposed at substantially regular intervals along a length of said hose;
   said layers of said internal portion comprising:
   an internal tube;
   a first reinforcement layer disposed about said internal tube;
   an intermediate layer disposed about said first reinforcement layer; and
   a second reinforcement layer disposed about said intermediate layer;

said external surface being disposed about said second reinforcement layer;

said internal tube comprising a polymer compound material;

said first reinforcement layer and said second reinforcement layer comprising a textile material;

said intermediate layer comprising a polymer compound material;

said external surface comprising a polymer compound material;

said first reinforcement layer being adherisation treated for attachment to adjacent layers of said internal portion;

said first reinforcement layer being adhesively attached to said internal tube and said intermediate layer;

each of said first reinforcement layer and said second reinforcement layer comprising a woven fabric material;

said conductive film being disposed between said intermediate layer and said second reinforcement layer;

said conductive film being concealed under said external surface portion of said hose;

external marking means for delineating lengths of said hose, said external marking means being disposed on an outer portion of said external surface portion;

said external marking means comprising at least one of paint and ink applied on the outer portion of said external surface portion;

said marking means being for supplementing said external marking means;

said conductive film being a sheath; and said conductive film and said gaps for being detected by electromagnetic detection means.

2. A hose comprising:

an external surface portion;

an internal portion being disposed substantially within said external surface portion;

marking means disposed substantially within said internal portion, said marking means being disposed over a length of said hose;

said marking means being configured for being detected by sensing means at least for measuring a length of said hose;

said marking means comprising a continuous conductive film and a plurality of gaps being cut into and disposed within said conductive film;

said conductive film being configured for being detected by sensing means;

said plurality of gaps comprising orifices being cut into and disposed within said conductive film;

said conductive film being continuously conductive between a plurality of said gaps; and said plurality of gaps being spaced apart and disposed over a length of said hose for being detected by the sensing means at least to measure a length of said hose;

said conductive film comprising a conductive polymer;

said internal portion comprising a plurality of coaxial cylindrical layers;

said conductive film being disposed between two of said layers;

said conductive film being self-adhesive and being adhesively attached to at least one of said layers of said internal portion;

said conductive film having an electrical conductivity substantially higher than that of other components of said hose;

said conductive film having an electrical conductivity about 10 times higher than that of other components of said hose;

said plurality of gaps being disposed at substantially regular intervals along a length of said hose;

said layers of said internal portion comprising:
an internal tube;
a first reinforcement layer disposed about said internal tube;
an intermediate layer disposed about said first reinforcement layer; and
a second reinforcement layer disposed about said intermediate layer;

said external surface being disposed about said second reinforcement layer;

said internal tube comprising a polymer compound material;

said first reinforcement layer and said second reinforcement layer comprising a textile material;

said intermediate layer comprising a polymer compound material;

said external surface comprising a polymer compound material;

said first reinforcement layer being adherisation treated for attachment to adjacent layers of said internal portion;

said first reinforcement layer being adhesively attached to said internal tube and said intermediate layer;

each of said first reinforcement layer and said second reinforcement layer comprising a woven fabric material;

said conductive film being disposed between said intermediate layer and said second reinforcement layer;

said conductive film being concealed under said external surface portion of said hose;

external marking means for delineating lengths of said hose, said external marking means being disposed on an outer portion of said external surface portion;

said external marking means comprising at least one of paint and ink applied on the outer portion of said external surface portion;

said marking means being for supplementing said external marking means;

said conductive film being a sheath; and said conductive film and said gaps for being detected by electromagnetic detection means.

* * * * *

UNITED STATES PATENT AND TRADEMARK OFFICE
CERTIFICATE OF CORRECTION

PATENT NO. : 5,243,128
DATED : September 7, 1993
INVENTOR(S) : Rene' MARCOZ

It is certified that error appears in the above-indentified patent and that said Letters Patent is hereby corrected as shown below:

In column 1, line 36, after 'mechanical', delete "device" and insert --devices--.

In column 7, line 60, after '4.', delete "As an" and insert --An--.

In column 10, line 41, after 'is', delete "substantially" and insert --essentially--.

In column 11, line 26, after the first occurrence of 'the', delete "sped" and insert --speed--.

In column 12, line 50, before 'by', delete "rotation" and insert --position--.

Signed and Sealed this

Sixteenth Day of August, 1994

*Attest:*

BRUCE LEHMAN

*Attesting Officer*         *Commissioner of Patents and Trademarks*